(12) United States Patent
Han et al.

(10) Patent No.: US 12,531,297 B2
(45) Date of Patent: Jan. 20, 2026

(54) BATTERY ASSEMBLY AND METHOD OF ASSEMBLING THE SAME

(71) Applicant: SK On Co., Ltd., Seoul (KR)

(72) Inventors: Kyu Hyun Han, Daejeon (KR); Yun Joo Noh, Daejeon (KR); Gang U Lee, Daejeon (KR); Jong Chan Lee, Daejeon (KR); Won Gab Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/677,880

(22) Filed: May 30, 2024

(65) Prior Publication Data
US 2024/0405329 A1 Dec. 5, 2024

(30) Foreign Application Priority Data

Jun. 2, 2023 (KR) .................. 10-2023-0071715
Nov. 9, 2023 (KR) .................. 10-2023-0154245
Apr. 15, 2024 (KR) .................. 10-2024-0050194

(51) Int. Cl.
*H01M 50/143* (2021.01)
*H01M 10/04* (2006.01)
*H01M 10/6551* (2014.01)
*H01M 50/117* (2021.01)
*H01M 50/211* (2021.01)
*H01M 50/505* (2021.01)

(52) U.S. Cl.
CPC ..... *H01M 50/143* (2021.01); *H01M 10/0404* (2013.01); *H01M 10/6551* (2015.04); *H01M 50/117* (2021.01); *H01M 50/211* (2021.01); *H01M 50/505* (2021.01)

(58) Field of Classification Search
CPC ............. H01M 50/143; H01M 50/211; H01M 50/505; H01M 50/117; H01M 10/6551; H01M 10/0404
See application file for complete search history.

(56) References Cited

U.S. PATENT DOCUMENTS

2020/0038698 A1 2/2020 Ryu et al.

FOREIGN PATENT DOCUMENTS

CN 214313377 U 9/2021
EP 3567651 A1 11/2019
(Continued)

OTHER PUBLICATIONS

WO 2021002626 English Translation (Year: 2021).*
(Continued)

*Primary Examiner* — Jimmy Vo
(74) *Attorney, Agent, or Firm* — IP & T GROUP LLP

(57) ABSTRACT

Embodiment of the present disclosure relates to a battery assembly including a plurality of battery cells stacked in a preset stacking direction, an accommodation case configured to accommodate the plurality of battery cells, an insertion space formed between the plurality of battery cells and the accommodation case, and a fire-retardant assembly disposed in the insertion space, wherein the fire-retardant assembly includes a fire-retardant member including a fire-retardant material, and a pillar-shaped exterior material configured to accommodate the fire-retardant member therein and extending in a height direction of the accommodation case.

18 Claims, 14 Drawing Sheets

(56) References Cited

FOREIGN PATENT DOCUMENTS

| EP | 4456256 A2 | 10/2024 | |
|---|---|---|---|
| JP | 2014-049226 A | 3/2014 | |
| JP | 2021048069 A | 3/2021 | |
| KR | 10-2009-0026648 A | 3/2009 | |
| KR | 10-1293859 B1 | 8/2013 | |
| KR | 20170137997 A * | 12/2017 | |
| KR | 10-1944942 B1 | 2/2019 | |
| KR | 10-2188110 B1 | 12/2020 | |
| KR | 10-2203248 B1 | 1/2021 | |
| KR | 10-2275878 B1 | 7/2021 | |
| KR | 10-2021-0151647 A | 12/2021 | |
| KR | 20220048433 A * | 4/2022 | |
| KR | 10-2022-0083055 A | 6/2022 | |
| KR | 10-2023-0040718 A | 3/2023 | |
| KR | 10-2024-0173161 A | 4/2024 | |
| KR | 10-2024-0117376 A | 8/2024 | |
| KR | 10-2025-0106945 A | 7/2025 | |
| KR | 10-2025-0106965 A | 7/2025 | |
| WO | WO-2021002626 A1 * | 1/2021 | ............... A62C 3/16 |
| WO | 2021/246756 A1 | 12/2021 | |
| WO | 2023/042505 A1 | 3/2023 | |

OTHER PUBLICATIONS

KR 20170137997 English Translation (Year: 2017).*
KR 20220048433 English Translation (Year: 2022).*
Office Action for Korean Patent Application No. 10-2024-0050231 issued by the Korean Intellectual Property Office (KIPO) on Jun. 30, 2025.
Extended European Search Report for the European Patent Application No. 24178889.2 issued by the European Patent Office on Nov. 8, 2024.
Extended European Search Report for the European Patent Application No. 24178894.2 issued by the European Patent Office on Nov. 15, 2024.
Office Action for Korean Patent Application No. 10-2024-0050194 issued by the Korean Intellectual Property Office Nov. 10, 2025.
Office Action for the European Patent Application No. 24178889.2 issued by the European Patent Office on Nov. 5, 2025.
Office Action for the European Patent Application No. 24178894.2 issued by the European Patent Office on Nov. 5, 2025.

* cited by examiner

BATTERY ASSEMBLY AND METHOD OF ASSEMBLING THE SAME

CROSS-REFERENCE TO RELATED APPLICATION

The present application claims priority under 35 U.S.C. § 119 (a) to Korean patent application number 10-2023-0071715 filed on Jun. 2, 2023 and Korean patent application number 10-2023-0154245 filed on Nov. 9, 2023 and Korean patent application number 10-2024-0050194 filed on Apr. 15, 2024, in the Korean Intellectual Property Office, the entire disclosure of which is incorporated by reference herein.

BACKGROUND

1. Field of the Invention

Embodiments of the present disclosure relates to generally a battery assembly and a method of assembling the same. Specifically, the embodiments of the present disclosure relates to a battery assembly with improved thermal stability and a method of assembling the same.

2. Discussion of Related Art

Due to recent fires and explosions that have occurred during the use of lithium secondary batteries, social concerns about the safety of secondary battery use are increasing. Based on such social concerns, one of the recent major development tasks for lithium secondary batteries is to eliminate unsafe conditions such as fires and explosions caused by thermal runaway of battery cells.

In particular, a typical battery module/pack may have an empty space therein in addition to the battery cells which are energy sources. When a fire occurs due to an external impact or a problem with the battery cell, the flame may spread to adjacent cells through the empty space, resulting in an increase in the damage from the fire. Since such risk of fire may be one of the biggest obstacles to an electric vehicle market, methods of reducing the spread of fire are being continuously researched.

SUMMARY OF THE INVENTION

First, one embodiment of the present disclosure is directed to preventing or mitigating hot gas generated from a battery assembly, for example, a battery cell in which thermal runaway has occurred among one or more battery cells provided inside the battery assembly, from being discharged toward a tab of the battery cell.

Second, another embodiment of the present disclosure is directed to venting hot gas generated from a battery cell in which thermal runaway has occurred along an intended path.

Third, still another embodiment of the present disclosure is directed to increasing the stability of a battery assembly by increasing heat resistance and fire resistance.

Fourth, yet another embodiment of the present disclosure is directed to a method of inserting a fire-retardant assembly (or a fire-retardant assembly material or a filler) into an empty space formed between a busbar assembly and a cell tab of a battery to the assembling process of the conventional battery assembly.

Fifth, yet another embodiment of the present disclosure is directed to providing an improved assembly method of more easily arranging a fire-retardant assembly when a battery assembly is assembled.

The battery assembly according to an embodiment of the present disclosure may be widely applied in the field of a green technology such as electric vehicles, battery charging stations, energy storage systems (ESS), photovoltaics using batteries, and wind power generation. In addition, the battery assembly according to an embodiment of the present disclosure may be used for eco-friendly mobility including electric vehicles and hybrid electric vehicles to prevent climate change by suppressing air pollution and greenhouse gas emission.

A battery assembly according to an embodiment of the present disclosure includes a plurality of battery cells stacked in a preset stacking direction, an accommodation case configured to accommodate the plurality of battery cells, an insertion space formed between the plurality of battery cells and the accommodation case, and a fire-retardant assembly disposed in the insertion space, wherein the fire-retardant assembly includes a fire-retardant member including a fire-retardant material, and an exterior material configured to accommodate the fire-retardant member therein.

The exterior material may start to melt when a preset temperature is reached.

The temperature may be lower than a melting point of the fire-retardant member.

The fire-retardant member may include silicon dioxide ($SiO_2$).

At least one of both end portions of the exterior material may have a tapered shape.

The exterior material may include a body portion in a pipe shape extending in a height direction of the accommodation case, a first end portion coupled to an upper side of the body portion to close one end of both open ends of the body portion, and a second end portion coupled to a lower side of the body portion to close the other open end, and the first end portion may have a tapered shape in a direction away from the body portion.

The second end portion may have an end face disposed parallel to a bottom surface of the accommodation case.

The accommodation case may include an accommodation body including an open upper surface and for accommodating the plurality of battery cells through the open upper surface, and an accommodation cover coupled to the accommodation body to cover the open upper surface, and the fire-retardant assembly may be disposed so that the first end portion is disposed to face the accommodation cover.

The exterior material may include a body portion in a cylindrical shape, in which at least one end of both ends of the body portion is open, and an end portion coupled to the body portion to close at least one open end.

A length of the exterior material in the height direction of the accommodation case may be greater than a length of the exterior material in the stacking direction.

A maximum length of the fire-retardant assembly in the stacking direction may be smaller than or equal to a thickness of any one of the plurality of battery cells.

The fire-retardant member may include a plurality of fire-retardant particles.

The fire-retardant member may include a roll-shaped fire-retardant sheet.

The exterior material may have a cylindrical shape.

The exterior material may have a polyhedral shape.

The battery assembly according to an embodiment of the present disclosure may further include a busbar electrically connected to the plurality of battery cells, wherein the insertion space may be located between the busbar and the plurality of battery cells.

The plurality of battery cells may each include a main body unit for accommodating an electrode assembly, and a lead tab unit of which at least a portion is located outside the main body unit and which is electrically connected to the electrode assembly, and the busbar may be electrically connected to the lead tab unit.

The insertion space may include a first insertion space formed between the plurality of battery cells and one side surface of the accommodation case extending in the stacking direction, and a second insertion space formed between the plurality of battery cells and the other side surface of the accommodation case facing the one side surface of the accommodation case, and the fire-retardant member may be disposed in at least any one of the first insertion space and the second insertion space.

The fire-retardant member may be a solid filler.

The solid filler may be in the form of a plurality of granular materials.

The exterior material may have a pillar shape extending in a height direction of the accommodation case.

A method of assembling a battery assembly includes stacking the plurality of battery cells, coupling the plurality of stacked battery cells to an accommodation cover, inserting the fire-retardant assembly, which includes a bead-shaped fire-retardant member including a fire-retardant material, into the insertion space, and an exterior material for accommodating the fire-retardant member therein and extending in a height direction of the accommodation case, and coupling an accommodation body, which is coupled to the accommodation cover to form the accommodation case, to the accommodation cover.

The method of assembling the battery assembly according to an embodiment of the present disclosure may further include, before the inserting of the fire-retardant assembly into the insertion space and after the coupling of the plurality of stacked battery cells to the accommodation cover, a first inverting operation of inverting the plurality of stacked battery cells.

The method of assembling the battery assembly according to an embodiment of the present disclosure may further include, after the coupling of the accommodation body to the accommodation cover, a second inverting operation of inverting the accommodation case.

The coupling of the accommodation body to the accommodation cover may include forming a heat sink unit on a body bottom surface forming a bottom surface of the accommodation body.

A battery assembly according to the present disclosure comprises at least one stack of a plurality of battery cells inside a casing; a fire-retardant assembly disposed between at least two adjacent battery cells and including a fire-retardant material enclosed inside an exterior material, wherein the exterior material has a melting point lower than a melting point of the fire-retardant member.

DETAILED DESCRIPTION

Hereinafter, exemplary embodiments of the present disclosure will be described in detail with reference to the accompanying drawings. A configuration or control method of a device to be described below is only for describing embodiments of the present disclosure and is not intended to limit the scope of the present disclosure, and the same reference numbers used throughout the specification denote the same components.

Specific terms used in the present specification are merely for convenience of description and are not used to limit the exemplary embodiments.

For example, terms such as "same" and "is the same" not only indicate the strictly same state, but also indicate a state in which there is a difference in tolerance or the degree to which the same function can be obtained.

For example, the term such as "toward any direction," "in any direction," "parallel to," "perpendicularly," "at the center," "concentric," or "coaxial," which indicates the relative or absolute arrangement, strictly indicates such arrangement, but also indicates a state of being relatively displaced with a tolerance, or an angle or distance of the degree to which the same function may be performed.

To describe the present disclosure, the following description will be made based on a spatial orthogonal coordinate system with X-, Y-, and Z-axes perpendicular to each other. Unless especially stated, a Z direction indicates a height direction, and an X-axis direction (or a first direction) indicates any one of directions perpendicular to the height direction. In addition, a Y-axis direction (or a second direction) indicates a direction perpendicular to the Z-axis direction and the X-axis direction.

However, the X-axis direction, Y-axis direction, and Z-axis direction, which will be described below, are for description for clear understanding of the present disclosure, and it goes without saying that the directions can be differently defined depending on a determined reference direction.

The use of terms such as "first," "second," and "third" in front of components to be described below is only to avoid confusion about the stated components, and are irrelevant to the order, importance, or master-slave relationship between the components. For example, an invention including only the second component without the first component may also be implemented.

The singular expression used herein includes the plural expression unless the context clearly dictates otherwise.

In addition, battery assemblies 200 and 300 according to an embodiment of the present disclosure are a general term for battery modules or battery packs. Therefore, the battery assemblies 200 and 300 according to an embodiment of the present disclosure may indicate both a battery module and a battery pack for accommodating battery cells without a battery assembly, such as a cell to pack (CTP).

Figure 1:
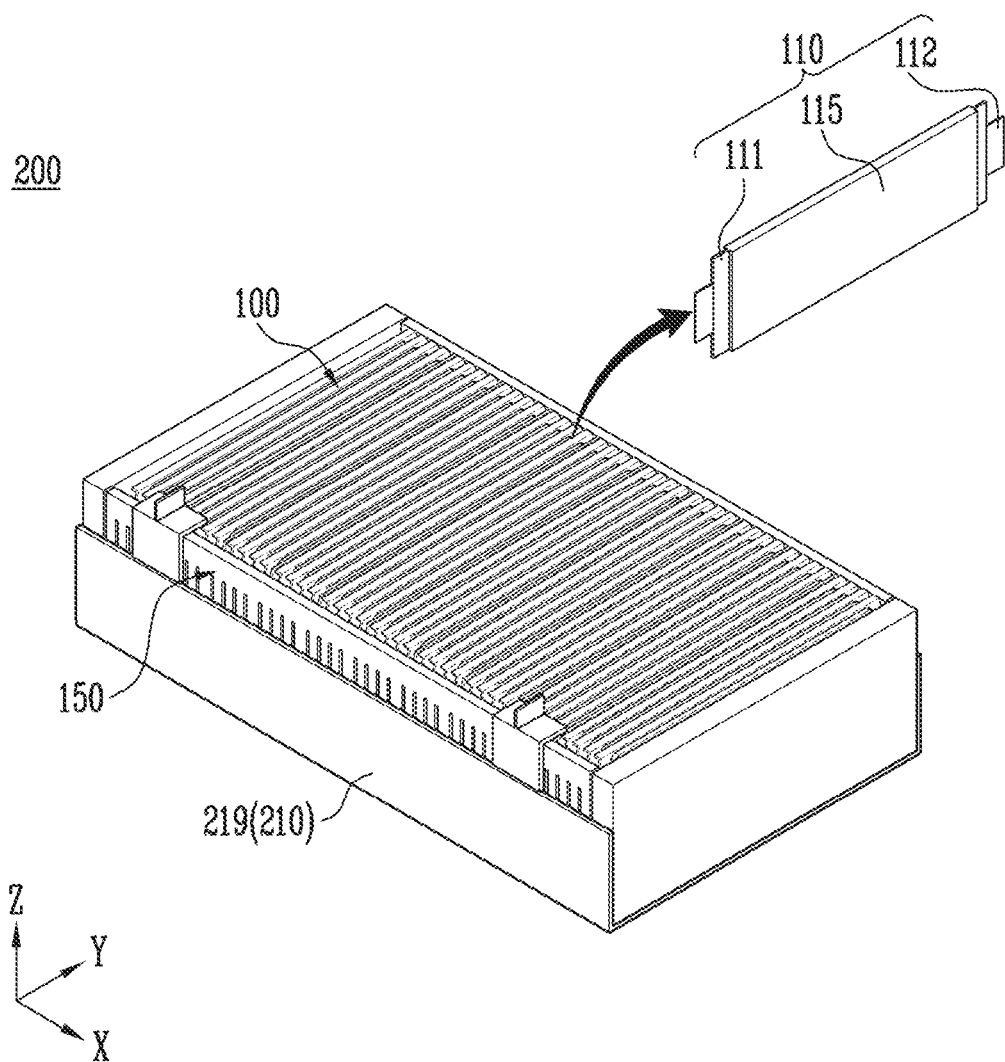
FIG. 1 is a view of a battery assembly according to an embodiment of the present disclosure.

FIG. 1 is a view of a battery assembly 200 according to an embodiment of the present disclosure.

Referring to FIG. 1, the battery assembly 200 may include a plurality of battery cells 110 and an accommodation case 210 for accommodating the plurality of battery cells 110.

Each of the plurality of battery cells 110 may include a main body unit 115 for producing or storing electrical energy, and lead tab units 111 and 112 protruding outward from the main body unit 115. The main body unit 115 may include an electrode assembly (not shown) including a positive electrode and a negative electrode therein to produce and store electrical energy therein.

In addition, the main body unit 115 further includes an electrolyte (not shown) in contact with the electrode assembly. The electrolyte may be liquid or solid. In addition, when the electrolyte is liquid, the electrode assembly may further include a separator for separating the positive electrode and the negative electrode. Referring to FIG. 1, the main body unit 115 may be in the form of a pouch sealed with a film-shaped exterior material.

Although FIG. 1 shows a pouch-shaped battery cell 110, the embodiments of the present disclosure are not limited thereto. Therefore, prismatic and cylindrical battery cells are also applicable.

Specifically, the lead tab units 111 and 112 may include the first lead tab unit 111 and the second lead tab unit 112 that protrude from both side surfaces of the main body unit 115 in a direction away from the main body unit 115. In another embodiment the lead tab units 111 and 112 may have both tabs provided on one side surface thereof.

The accommodation case 210 is intended to protect the plurality of battery cells 110 from an external impact such as vibrations. The accommodation case 210 may include an accommodation body 219 that forms a portion of an accommodation space 280 for accommodating the plurality of battery cells 110 to be described below.

In addition, the battery assembly 200 may further include a busbar assembly 150 for electrically connecting the plurality of battery cells 110 to external parts. The busbar assembly 150 may include a busbar 170 (see FIG. 2) for electrically connecting the plurality of battery cells 110 to output a preset voltage. The form in which the busbar assembly 150 or the busbar 170 to be described below, is assembled with the plurality of battery cells 110 may be referred to as a cell stack 100.

Figure 2:
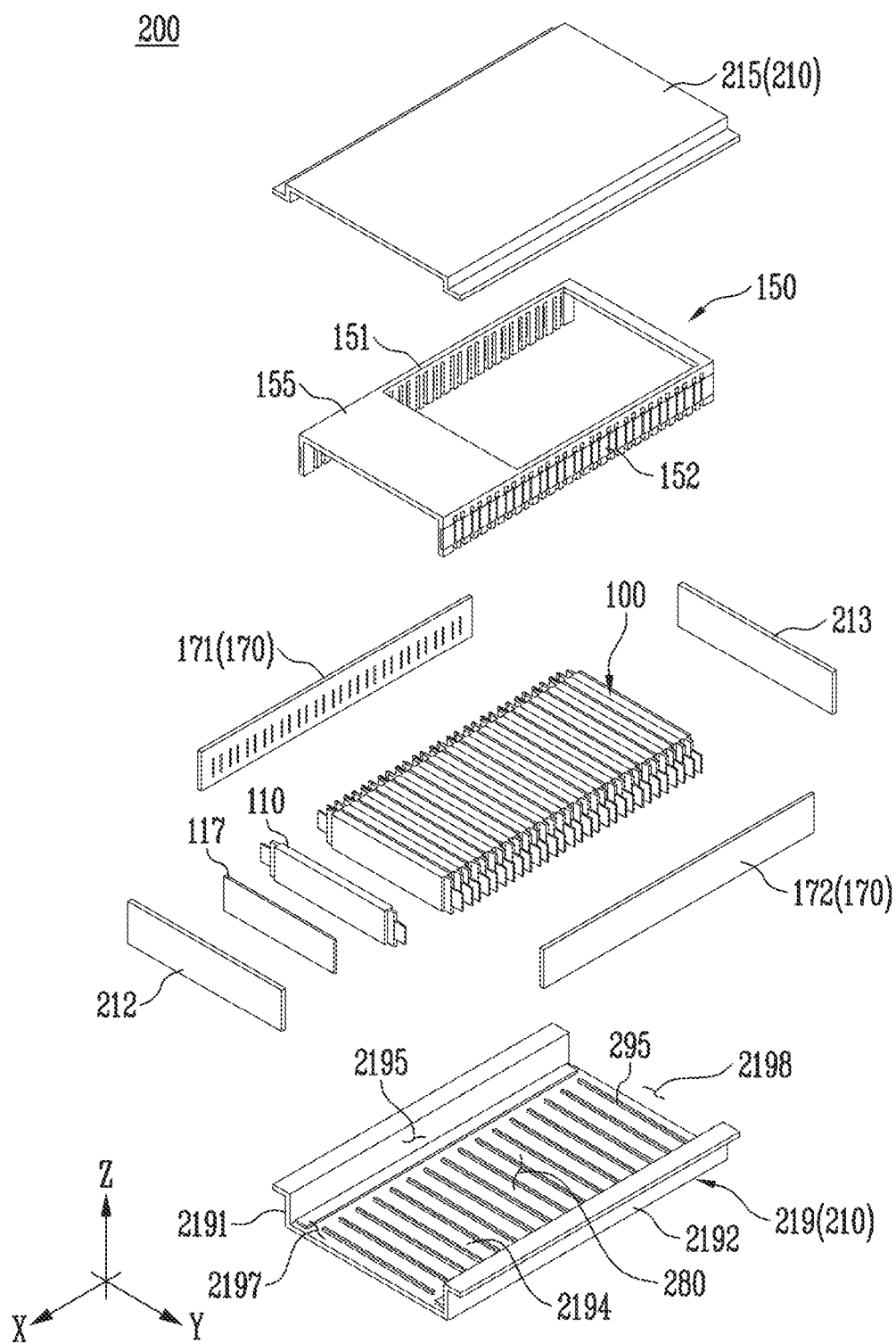
FIG. 2 is an exploded view of a battery assembly according an embodiment of to the present disclosure.

FIG. 2 is an exploded view of a battery assembly 200 according an embodiment of to the present disclosure.

Referring to FIG. 2, the accommodation case 210 may include the accommodation body 219 forming a portion of the accommodation space 280 for accommodating the plurality of battery cells 110, and an accommodation cover 215 coupled to the accommodation body 219 to form the accommodation space 280 together.

Inside the accommodation body 219, the plurality of battery cells 110 may be located to overlap each other in a preset stacking direction (e.g., the X-axis direction).

More specifically, the accommodation case 210 may include an open upper surface 2195 and further include the accommodation body 219 for accommodating the plurality of battery cells 110 through the open upper surface 2195, and the accommodation cover 215 coupled to the accommodation body 219 to close the open upper surface 2195.

Therefore, the accommodation cover 215 may be coupled to the accommodation body 219 to form an upper surface of the accommodation space 280 or an upper surface of the accommodation case 210. That is, the accommodation cover 215 is coupled to the accommodation body 219 to close the open upper surface 2195 and forms the accommodation space 280 together with the accommodation body 219.

The accommodation space 280 may be formed inside the accommodation body 219 and include a space for accommodating the cell stack 100. In addition, the accommodation space 280 may further include an insertion space 288 to be described below.

The accommodation body 219 may be provided in a channel shape or U shape with an open upper portion. Referring to FIG. 2, both side surfaces 2197 and 2198 facing each other in the X-axis direction among the side surfaces of the accommodation body 219 may also be open.

That is, the accommodation body 219 may include a body bottom surface 2194 forming a bottom surface of the accommodation space 280, and body side surfaces 2191 and 2192 extending from edges (not shown) provided parallel to each other in the stacking direction among edges of the body bottom surface 2192 toward the accommodation cover 215. Free ends of the body side surfaces 2191 and 2192 may be bent to form flanges (not shown), which can be easily coupled with the accommodation cover 215.

Referring to FIGS. 1 and 2, a height of the accommodation body 219 may be smaller than heights of the plurality of battery cells 110. However, in another embodiment the height of the accommodation body 219 may be greater than or equal to the heights of the plurality of battery cells 110.

The cell stack 100 may further include a buffering member 117 or a heat blocking member 119 (see FIG. 3) located between the plurality of battery cells 110. The buffering member 117 may be located between the battery cells 110 or located between battery groups BG1 to BG5 (see FIG. 12) in which the plurality of battery cells 110 are grouped. It is also applied to the heat blocking member 119.

The heat blocking member 119 may serve as a thermal barrier for preventing flame or heat from spreading to adjacent battery cells 110 when thermal runaway occurs in any one battery cell 110.

The cell stack 100 may include one or more buffering members 117. Likewise, the cell stack 100 may include one or more heat blocking members 119. The buffering member 117 and the heat blocking member 119 may be formed as a single member to simultaneously perform a heat blocking function and a buffering function.

To this end, the heat blocking member 119 may be formed in a multilayered structure in a direction in which the plurality of battery cells 110 are stacked. That is, one layer of the multilayered structure may be made of a flame-retardant material (or a fire-retardant material). In addition, another layer of the multilayered structure may serve to reduce a pressure applied to another battery cell 110 upon swelling of the battery cell 110.

The plurality of battery cells 110 and the plurality of buffering members 117 may be stacked by being provided at preset locations. For example, referring to FIG. 2, an example in which long edges of the plurality of battery cells 110 are provided parallel to the Y-axis direction. Therefore, the plurality of battery cells 110 and the plurality of buffering members 117 will be located to overlap each other in the X-axis direction. It is also applied to the heat blocking member 119.

The heat blocking member 119 may be made of a fire-retardant (heat-resistant or flame-retardant) material. For example, the heat blocking member 119 may include a material such as fire-retardant polymer or mica.

Referring to FIG. 2, the battery assembly 200 may further include end plates 212 and 213 at both ends of the cell stack 100 in the stacking direction. The end plates 212 and 213 may be provided at both ends of the cell stack 100 or formed to be connected to both side surfaces 2197 and 2198 of the accommodation body 219.

The end plates 212 and 213 are used to prevent both side surfaces of the cell stack 100 from being exposed to the outside.

The battery assembly 200 may include a busbar 170 electrically connected to the plurality of battery cells 110. In addition, the battery assembly 200 may further include busbar frames 151, 152, and 155 for supporting the busbar 170 and the plurality of battery cells 110. The busbar 170 and the busbar frames 151, 152, and 155 may be collectively referred to as the busbar assembly 150. That is, the busbar assembly 150 may include the busbar 170 electrically connected to the plurality of battery cells 110.

The busbar frames 151, 152, and 155 may be electrically connected to the outside to store (or charge) electrical energy in the plurality of battery cells 110 or supply (or discharge) the electrical energy stored in the plurality of battery cells 110 to the outside.

The busbar assembly 150 may include the first busbar frame 151 and the second busbar frame 152 that extend in the stacking direction of the plurality of battery cells 110 with the plurality of battery cells 110 interposed therebetween.

In addition, the busbar assembly 150 may further include a support frame 155 located at one side of the busbar assembly 150 to connect the first busbar frame 151 with the second busbar frame 152.

The busbar assembly 150 is described using a case in which the lead tab units 111 and 112 are each located in opposite directions of the main body unit 115. On the other hand, when the lead tab units 111 and 112 are located at one side of the main body unit 115 and located in the same direction, the busbar frames 151 and 152 may be located at one side of the main body unit 115, for example, above the main body unit 115 and electrically connected to the lead tab units 111 and 112.

The support frame 155 may serve to prevent the deformation of the first busbar frame 151 and the second busbar frame 152 and support the first busbar frame 151 and the second busbar frame 152. In addition, some of the electrical devices for sensing and controlling the plurality of battery cells 110 may be disposed on the support frame 155.

Referring to FIG. 2, the shape of the busbar assembly 150 may be a tunnel shape. In addition, lengths of the first busbar frame 151 and the second busbar frame 152 may be greater than a length of the support frame 155 in the stacking direction.

That is, the support frame 155 may be connected to the first busbar frame 151 and the second busbar frame 152 to cover the upper portions of the plurality of battery cells 110. That is, the support frame 155 may cover some or all of the upper portions of the plurality of battery cells 110.

Referring to FIG. 2, the busbar 170 may include a first busbar 171 supported by the first busbar frame 151 and electrically connected to the first lead tab unit 111 and a second busbar 172 supported by the second busbar frame 152 and electrically connected to the second lead tab unit 112.

The first busbar 171 and the second busbar 172 may be located away from the plurality of battery cells 110 more than the first busbar frame 151 and the second busbar frame 152, respectively. That is, the first busbar 171 and the second busbar 172 may be located closer to the body side surfaces 2191 and 2192 than the first busbar frame 151 and the second busbar frame 152. Therefore, the first lead tab unit 111 and the second lead tab unit 112 may be inserted into a slit hole (not shown) formed in the first busbar frame 151 and the second busbar frame 152 and electrically connected to the first busbar 171 and the second busbar 172, respectively. However, it is only an example, and the first lead tab unit 111 and the second lead tab unit 112 may be electrically connected in a different manner from the first busbar 171 and the second busbar 172, respectively.

The battery assembly 200 may further include a heat sink unit 295 located between the body bottom surface 2194 and the plurality of battery cells 110 to transfer heat generated from the plurality of battery cells 110 to the outside of the battery assembly 200. The heat sink unit 295 may be formed of an adhesive material having thermal conductivity, such as a heat sink adhesive. Therefore, the plurality of battery cells 110 may be bonded to the body bottom surface 2194 through the heat sink unit 295. To this end, the heat sink unit 295 may be sprayed or applied on the body bottom surface 2194.

Figure 3:
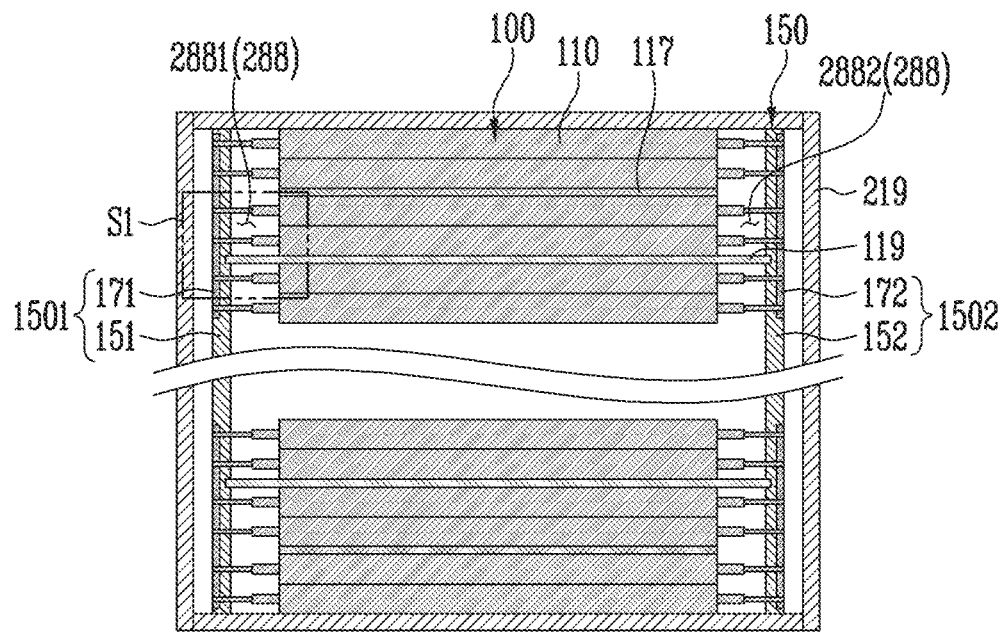
FIG. 3 is a top view of the battery assembly according to an embodiment of the present disclosure.

FIG. 3 is a top view of the battery assembly 200 according to an embodiment of the present disclosure.

The busbar assembly 150 may include the first busbar 171 electrically connected to the first lead tab unit 111 and the first busbar frame 151 for supporting the first busbar 171. The first busbar 171 and the first busbar frame 151 may be collectively referred to as a first busbar assembly 1501. That is, the first busbar assembly 1501 may be electrically connected to the first lead tab unit 111 and support the cell stack 100.

The busbar assembly 150 may further include the second busbar 172 electrically connected to the second lead tab unit 112 and the second busbar frame 152 for supporting the second busbar 172. The second busbar 172 and the second busbar frame 152 may be collectively referred to as a second busbar assembly 1502. That is, the second busbar assembly 1502 may be electrically connected to the second lead tab unit 112 and support the cell stack 100 together with the first busbar assembly 1501.

Referring to FIG. 3, due to the electrical connection between the lead tab units 111 and 112 and the busbar assembly 150, an empty space (hereinafter referred to as "insertion space 288") may be formed between the plurality of battery cells 110 and the busbar assembly 150.

That is, a portion of the accommodation space 280 formed inside the accommodation case 210 may be a space for accommodating the plurality of battery cells 110, and the remaining portion of the accommodation space 280 may be a space for the insertion space 288.

Specifically, the insertion space 288 is a space formed by each main body unit 115, each of the lead tab units 111 and 112, and the busbar 170. Typically, when thermal runaway occurs in any of the plurality of battery cells 110 and off-gas is generated, high-temperature heat may be transferred to adjacent battery cells through the insertion space 288. To prevent such heat transfer, it is necessary to fill or close the insertion space 288.

To this end, the battery assembly 200 according to an embodiment of the present disclosure may include a fire-retardant assembly 270 (see FIG. 5) located by being inserted into the insertion space 288.

That is, the battery assembly 200 according to an embodiment of the present disclosure may include the plurality of battery cells 110 arranged by being stacked in a preset stacking direction, the accommodation case 210 for accommodating the plurality of battery cells 110, the insertion space 288 formed between the plurality of battery cells 110 and the accommodation case 210, and the fire-retardant assembly 270 located in the insertion space 288.

Referring to FIG. 3, the buffering member 117 may be located between the plurality of battery cells 110. The buffering member 117 may be provided in each space between the plurality of battery cells 110. Alternatively, the buffering member 117 may be located between the battery groups BG1 to BG5 (see FIG. 12) in which adjacent battery cells 110 are grouped into a preset number of groups.

Referring to FIG. 3, although an example in which the length of the buffering member 117 in a direction from the first busbar frame 151 to the second busbar frame 152 is smaller than the length or less of the main body unit 115 (see FIG. 1) is shown, but the present disclosure is not limited thereto.

Referring to FIG. 3, the heat blocking member 119 may be located between the plurality of battery cells 110. The heat blocking member 119 may be provided in each space between the plurality of battery cells 110. Alternatively, the heat blocking member 119 may be located between the battery groups BG1 to BG5 in which the adjacent battery cells 110 are grouped into the preset number of groups.

The battery groups BG1 to BG5 indicate a set of battery cells in which the adjacent battery cells 110 among the plurality of battery cells 110 are grouped into the preset number of groups. The plurality of battery cells 110 may be grouped into the number of groups for a preset target voltage or target current, and then the battery groups BG1 to BG5 may be grouped using the busbar 170 and connected in series or parallel.

Referring to FIG. 3, although an example in which the length of the buffering member 117 in a direction from the first busbar frame 151 to the second busbar frame 152 is smaller than the length or less of the main body unit 115 (see FIG. 1) is shown, but the present disclosure is not limited thereto.

Referring to FIG. 3, the heat blocking member 119 and the buffering member 117 are shown as separate members, but alternatively, may be formed as one member as described above. It may be referred to as a fire-retardant assembly (not shown).

That is, the fire-retardant assembly may be located between the plurality of battery cells 110 to block heat during thermal runaway and buffer a surface pressure of the battery cells during swelling.

A length of the heat blocking member 119 may be greater than a length of the main body unit 115 in the direction from the first busbar frame 151 to the second busbar frame 152. More specifically, the heat blocking member 119 may be in contact with the first busbar assembly 1501 and the second busbar assembly 1502. Therefore, the heat blocking member 119 will be able to block or delay the spread of heat or flame to another location in case of thermal runaway of any battery cell 110.

Figure 4:
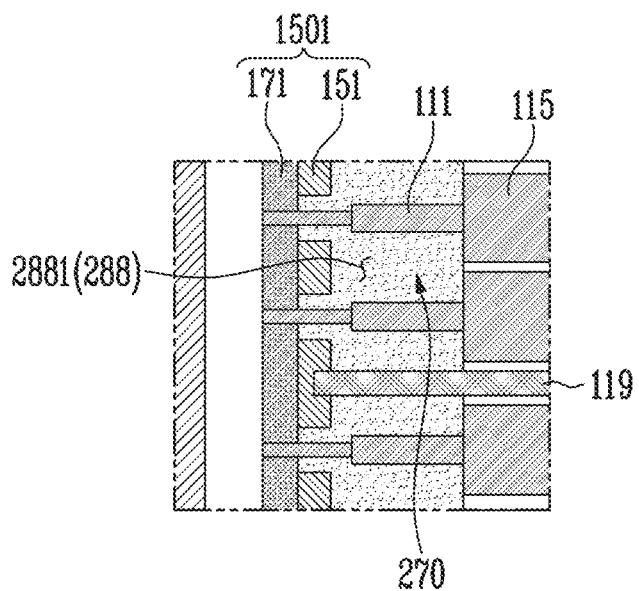
FIG. 4 is an enlarged view of portion S1 in FIG. 3.

FIG. 4 is an enlarged view of portion S1 in FIG. 3.

Specifically, portion S1 may be a partial area of the insertion space 288. The battery assembly 200 may further include the insertion space 288 formed between the cell stack 100 and the busbar assembly 150 or the plurality of battery cells 110 and the busbar 170.

Specifically, the battery assembly 200 may include a first insertion space 2881 and a second insertion space 2882 (see FIG. 3) between one side surface of the main body unit 115 of each of the plurality of battery cells 110 and the first busbar 171 and between the other side surface of the main body unit 115 of each of the plurality of battery cells 110 and the second busbar 172, respectively.

Referring to FIGS. 3 and 4, the fire-retardant assembly 270 may be located in at least one of the first insertion space 2881 and the second insertion space 2882. In FIG. 4, only the corresponding location of the fire-retardant assembly 270 is marked to emphasize that it is located in the insertion space 288, and the shape of the fire-retardant assembly 270 is not specifically shown.

That is, the fire-retardant assembly 270 may be located in at least one of the first insertion space 2881 and the second insertion space 2882.

More specifically, portion S1 in FIG. 4 shows a portion of the first insertion space 2881. One side surface of the main body unit 115 may be a side surface on which the first lead tab unit 111 is located, and the other side surface of the main body unit 115 may be a side surface on which the second lead tab unit 112 is located.

The first insertion space 2881 may be divided by the first lead tab unit 111. In addition, the second insertion space 2882 may be divided by the second lead tab unit 112. However, when the cell stack 100 is accommodated in the accommodation body 219, since lengths of the first lead tab unit 111 and the second lead tab unit 112 in a height direction of the accommodation case 210 or the accommodation body 219 are smaller than the height of the battery cell 110, each of the divided first insertion spaces 2991 and the divided second insertion spaces 2882 may communicate with each other.

In addition, the first insertion space 2881 and the second insertion space 2882 may communicate with each other through a space between the plurality of battery cells 110 and the accommodation cover 215. Therefore, the first insertion space 2881 and the second insertion space 2882 are not spaces that are isolated by being separated from each other, but may be spaces that may communicate with each other.

Figure 5:
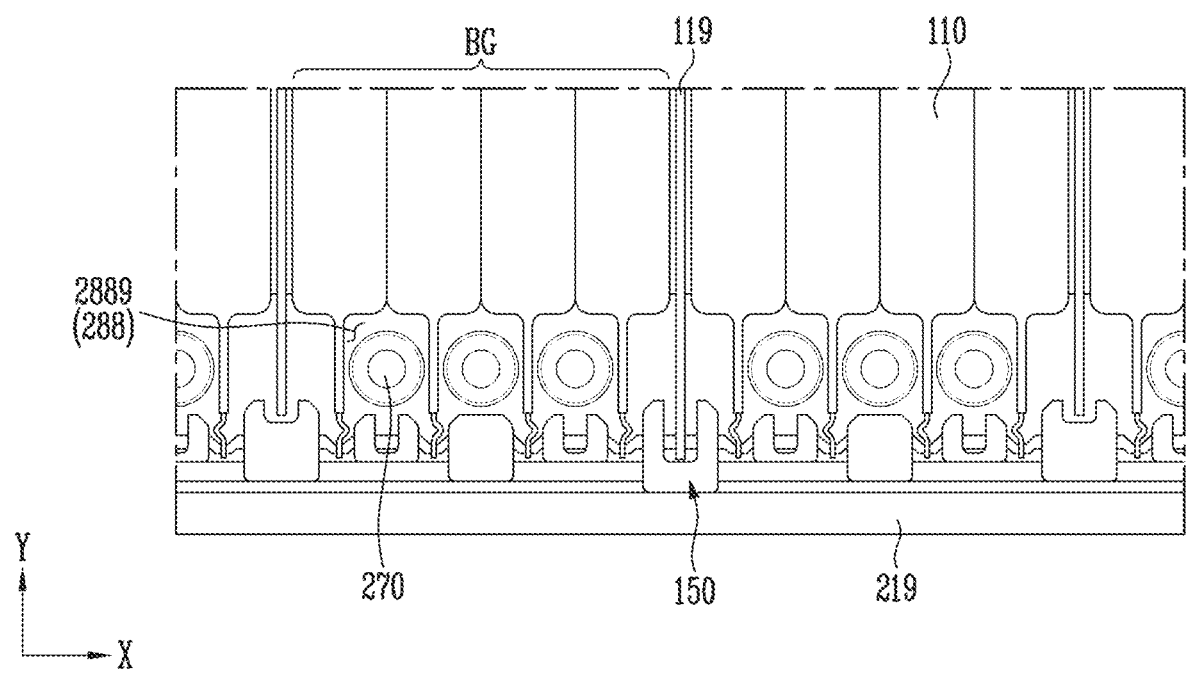
FIG. 5 is a schematic top view showing a fire-retardant assembly accommodated in an insertion space according to an embodiment of the present disclosure.

FIG. 5 is a schematic top view showing a fire-retardant assembly 270 accommodated in an insertion space 288 according to an embodiment of the present disclosure.

The battery assembly 200 may have the insertion space 288 formed between the plurality of battery cells 110 and the busbar assembly 150 (or the busbar 170). The insertion space 288 may be formed by connecting each of the lead tab units 111 and 112 to the busbar assembly 150 (or the busbar 170).

The insertion space 288 may include a plurality of separation spaces 2889 separated by each of the lead tab units 111 and 112. Each of the lead tab units 111 and 112 does not separately isolate the plurality of separation spaces 2889. That is, since the length of each of the lead tab units 111 and 112 in the height direction of the accommodation case 210 is smaller than the height of the accommodation space 280, each of the lead tab units 111 and 112 separates only at least some separation spaces 2889 in the height of the accommodation space 280.

That is, since the length of each of the lead tab units 111 and 112 in the height direction of the accommodation case 210 is smaller than the length of each of the main body unit 115, the plurality of insertion spaces 288 may be separated by each of the lead tab units 111 and 112 or may communicate with each other.

More specifically, a plurality of first insertion spaces 2881 may be formed by the first lead tab unit 111, and the plurality of first insertion spaces 2881 may communicate with each other. Likewise, the plurality of second insertion spaces 2882 may be formed by the second lead tab unit 112, and the plurality of second insertion spaces 2882 may communicate with each other.

Therefore, as described above, the plurality of separation spaces 2889 may communicate with each other. In addition, a plurality of fire-retardant assemblies 270 may be provided and inserted one-to-one into the plurality of separation spaces 2889.

Referring to FIG. 5, the battery assembly 200 may further include the heat blocking member 119 located between the plurality of battery cells 110. Alternatively, the battery assembly 200 may further include the heat blocking member 119 located between the battery groups BG in which the plurality of battery cells 110 are grouped.

Referring to FIG. 5, the heat blocking member 119 may be provided parallel to the plurality of battery cells 110 and extend to the busbar assembly 150. More specifically, the heat blocking member 119 may extend to the busbar frames 151 and 152 and may be inserted into the busbar frames 151 and 152. In this case, the fire-retardant assembly 270 may not be inserted into the space in which the heat blocking member 119 is inserted, which is to prevent interference between the fire-retardant assembly 270 and the heat blocking member 119.

Figure 6A:
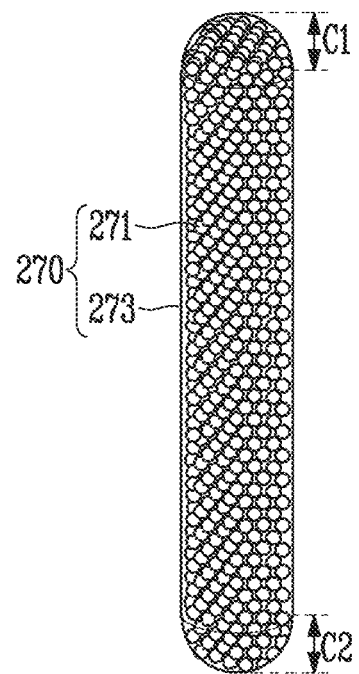
FIG. 6A is a view of the fire-retardant assembly accommodated in the insertion space.
Figure 6B:
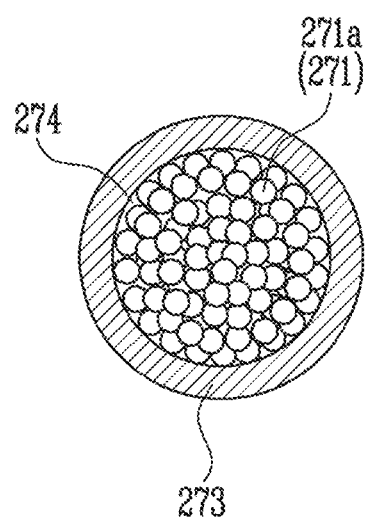
FIG. 6B is a cross-sectional view of the heat-resistant assembly shown in FIG. 6A.
Figure 6C:
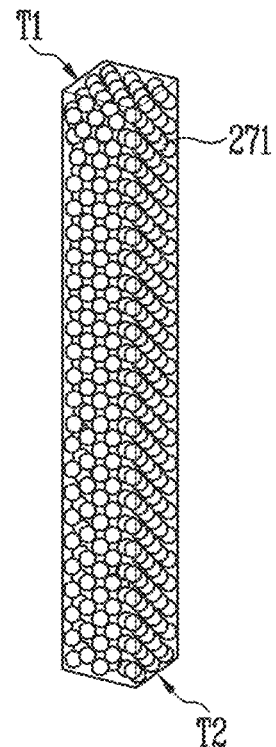
FIG. 6C is another example view of the fire-retardant assembly accommodated in the insertion space, according to embodiments of the present disclosure.

FIG. 6A is a view of the fire-retardant assembly 270 accommodated in the insertion space 288, FIG. 6B is a cross-sectional view of the fire-retardant assembly 270 shown in FIG. 6A, and FIG. 6C is another example view of the fire-retardant assembly 270 accommodated in the insertion space 288, according to embodiments of the present disclosure.

As shown in FIG. 6A, the fire-retardant assembly 270 may have a cylindrical shape. Therefore, the fire-retardant assembly 270 may have the same shape as a circular shape shown above the cylindrical shape of FIG. 6A.

Referring to FIG. 6A, the schematic shape of the fire-retardant assembly 270 may be cylindrical. In addition, a height of the cylindrical fire-retardant assembly 270 may be smaller than a diameter of the fire-retardant assembly.

In addition, considering the size of the insertion space 288, the diameter of the fire-retardant assembly 270 may be smaller than or equal to a thickness of any of the plurality of battery cells, which is to allow the fire-retardant assembly 270 to be easily inserted into the insertion space 288.

Both ends of the cylindrical fire-retardant assembly 270 may be provided in a tapered shape, which is to allow the fire-retardant assembly 270 to be easily inserted into the insertion space 288. That is, when the fire-retardant assembly 270 is inserted into the insertion space 288, areas C1 and C2 including both ends of the fire-retardant assembly 270 have a tapered shape to allow the fire-retardant assembly 270 to be guided into the insertion space 288.

In addition, the shapes of the areas C1 and C2 including both ends of the fire-retardant assembly 270 may be symmetrical, which is to increase the convenience of assembly of the battery assembly 200 by inserting the fire-retardant assembly 270 into the insertion space 288 regardless of the top and bottom of the fire-retardant assembly 270.

That is, the schematic shapes of the areas C1 and C2 including both ends of the fire-retardant assembly 270 may be the same.

FIG. 6A is only the schematic shape of the fire-retardant assembly 270, and specifically, as shown in FIG. 6B, the fire-retardant assembly 270 may include a fire-retardant member 271 containing a fire-retardant material, and an exterior material 273 for accommodating the fire-retardant member 271 therein.

That is, the exterior material 273 may further include a fire-retardant space 274 formed by the exterior material 273 to accommodate the fire-retardant member 271.

The exterior material 273 may have a pillar shape extending in the height direction of the accommodation case 210.

FIG. 6A is a view in which the exterior material 273 has the cylindrical shape, whereas FIG. 6C is another view in which the exterior material 273 has a polyhedral shape. For example, the exterior material 273 may have a rectangular parallelepiped or polyhedral shape. The shape of the exterior material 273 is not limited thereto and may have any shape as long as it may be inserted into the insertion space 288.

In FIGS. 6A to 6C, although fire-retardant particles 271a are spherical for illustration, the shapes of the fire-retardant particles 271a are not limited to a sphere. Therefore, the fire-retardant particles 271a may have an amorphous shape. In addition, the fire-retardant particles 271a are not limited to any one size, but may be a shape in which various sizes of the fire-retardant particles 271a are mixed.

Referring to FIG. 6C, the fire-retardant assembly 270 may include the fire-retardant particles 271a and an exterior material 273 for accommodating the fire-retardant member 271 therein and is formed into a preset three-dimensional shape.

The three-dimensional shape is a rectangular parallelepiped shape which is shown as an example, but may also be a cylindrical shape as shown in FIG. 6A. The exterior material 273 may have any three-dimensional shape as long as it may accommodate the fire-retardant member 271 therein.

In addition, referring to FIG. 6C, both ends T1 and T2 of the rectangular parallelepiped-shaped fire-retardant assembly 270 are shown as planar shapes, but alternatively, may be provided as curved shapes.

A maximum length of the fire-retardant assembly 270 in a direction parallel to the height direction of the accommodation case 210 may be greater than a maximum length of the fire-retardant assembly 270 in a direction parallel to the stacking direction. It is the same reason why the height of the cylindrical fire-retardant assembly 270 described in FIG. 6A is greater than the diameter of the cylindrical fire-retardant assembly 270.

Likewise, considering that the fire-retardant assembly 270 should be inserted into the plurality of separation spaces 2889 (see FIG. 5), the maximum length of the fire-retardant assembly 270 in the stacking direction may be smaller than or equal to the thickness of any of the plurality of battery cells in the stacking direction.

Referring to FIGS. 6A to 6C, the fire-retardant member 271 may include a plurality of fire-retardant particles 271a.

The fire-retardant particles 271a may be solid fillers provided in the form of solid particles, powder, granules, pellets, or beads, which is to prevent or delay flame transfer or heat transfer through the insertion space 288 when thermal runaway occurs in any battery cell 110.

The sizes of the fire-retardant particles 271a may preferably be 2 μm or more and less than or equal to the length or thickness of one battery cell 110 in the stacking direction.

Preferably, the fire-retardant particles 271a may have a micrometer scale. The micrometer-scaled fire-retardant particles 271a may be referred to as microbeads or microgranules.

In an embodiment, the sizes of the fire-retardant particles 271a may be the size of the diameter of a spherical shape of which a radius is a distance from the center (or center of gravity) of the fire-retardant particle 271a to the farthest outer edge. Therefore, the size of the fire-retardant particle 271a may be the maximum outer diameter of the fire-retardant particle 271a. Alternatively, the size of the fire-retardant particle 271a may be an average value calculated after measuring the fire-retardant particles 271a in several directions. It may also be applied even when the fire-retardant particles 271a are in the form of particles.

The reason why the size of the fire-retardant particle 271a should be 2 μm or more is to prevent the fire-retardant particles 271a from being discharged into a space other than the insertion space 288, such as a space between the accommodation case 210 (see FIG. 1) and the busbar assembly 150 (see FIG. 2).

The lead tab units 111 and 112 (see FIG. 1) may be formed to pass through the busbar 170 to be electrically connected to the busbar 170 (see FIG. 2). To this end, the busbar 170 may include a slit hole (not shown) formed to pass through the busbar 170. The lead tab units 111 and 112 may be welded after being inserted into the slit hole. The slit hole will be closed by welding, and at this time, a welding bead (not shown) may be formed in the welding area of the slit hole due to welding. The welding bead has a unique shape that may occur during welding. The welding bead may also have microscopic air gaps, and since the size of the air gap formed in the welding bead is about 2 μm, the size or outer diameter of the fire-retardant particle 271a may preferably be 2 μm or more to prevent the fire-retardant particles 271a from being discharged through the air gaps. That is, the size of the fire-retardant particle 271a may be preferably greater than or equal to the size of the air gap formed in the welding bead.

In addition, the size or outer diameter of the fire-retardant particle 271a may be smaller than the length or thickness of one battery cell in the stacking direction. The reason is that only when the size or diameter of the fire-retardant particle 271a is smaller than the distance between one of the lead tab units 111 and 112 and the other of the lead tab units 111 and 112 adjacent to the one of the lead tab units 111 and 112, the fire-retardant particle 271a may be accommodated in the insertion space 288 (see FIG. 3) formed between the one of lead tab units 111 and 112 and the other of the lead tab units 111 and 112.

For example, when the thickness of the battery cell 110 is 15 mm, the size or outer diameter of the fire-retardant particle 271a may be 15 mm or less.

That is, the size of the fire-retardant particle 271a should be less than or equal to a distance between one of the battery cells 110 among the plurality of battery cells 110 and another adjacent to the one battery cell 110 in the stacking direction and may be smaller than or equal to a distance between the one and the other of the lead tab units 111 and 112 in the stacking direction.

In addition, the fire-retardant particles 271a are not determined to be the same size or material, but may be a form in which various sizes or various materials of the fire-retardant particles 271a are mixed.

The melting point of the fire-retardant particles 271a may preferably be higher than a preset temperature (or an allowable temperature) to be described below. Preferably, the preset temperature (or the allowable temperature) may be 50° C. or higher and 300° C. or lower. The exterior material 273 may start to melt when the preset temperature is reached. Therefore, the melting point of the fire-retardant particles 271a should be higher than the preset temperature.

In addition, the melting point of the fire-retardant particles 271a may be higher than the ignition points of the plurality of battery cells 110. The ignition points of the plurality of battery cells 110 may be the temperature when venting occurs in the battery cell 110. Alternatively, when the exterior material (or the accommodation case) of the battery cell 110 is torn or opened in the thermal runway situation, the ignition points of the plurality of battery cells 110 may be the temperature of the electrolyte accommodated inside the battery cell 110, that is, inside the main body unit 115.

Therefore, when thermal runaway starts to occur in any of the battery cells 110, the exterior material 273 starts to melt, but the fire-retardant particles 271a can maintain the solid form, which is to prevent the fire-retardant particles 271a from burning or melting.

For example, even when the thermal runaway occurs in the battery cell 110, the fire-retardant particles 271a are not burnt or melted, and the external shape of the fire-retardant particles 271a can be maintained without significant change.

The fire-retardant member 271 or the fire-retardant particles 271a may include a porous material. The porous material indicates a material including pores inside a structure. A shape of the pore may be an irregular and amorphous shape. Specifically, when the fire-retardant member 271 or the fire-retardant particles 271a include silica gel in particles or powder form, the porosity of the fire-retardant particle 271a may be in the range of 20% or more and 30% or less.

The fire-retardant member 271 or the fire-retardant particles 271a may be inserted into the fire-retardant space 274 formed by the exterior material 273 and may move freely. That is, the fire-retardant member 271 or the fire-retardant particles 271a may not be fixed or coupled to other structures or components of the battery assembly 200. Simply, the fire-retardant member 271 or the fire-retardant particles 271a are located in the fire-retardant space 274 and are in contact with each other without separate restraint.

That is, the fire-retardant member 271 or the fire-retardant particles 271a may be a solid filler. The solid filler may be in the form of a plurality of granular materials.

Therefore, the fire-retardant assembly 270 may include a plurality of air gaps (not shown) formed between the fire-retardant members 271 or the fire-retardant particles 271a. When the exterior material 273 melts and the fire-retardant member 271 or the fire-retardant particles 271a located in the fire-retardant space 274 are exposed to the accommodation space 280, the plurality of air gaps may serve to delay heat transfer and disperse flame in various paths rather than a straight line.

In addition, in a high-temperature and high-humidity environment during thermal runaway, the plurality of air gaps (not shown) may serve as electrical insulating members or thermal insulating members.

In addition, the fire-retardant material may be an inorganic compound. That is, the fire-retardant particles 271a may include a fire-retardant material formed of an inorganic compound. The inorganic compound may include any compound selected from the group consisting of alum ($K_2SO_4 \cdot Al_2(SO_4)_3 \cdot 24H_2O$), borax ($Na_2B_4O_7 \cdot 10H2O$), lime water ($Ca(OH)_2$ aqueous solution), quicklime (CaO), white emulsion obtained by mixing milk of lime ($Ca(OH)_2$) with water, slaked lime ($Ca(OH)_2$), washing soda ($Na_2CO_3 \cdot 10H_2O$), apatite ($Ca_5(PO_4) \cdot 3OH$), baking powder (salt mixture of $NaHCO_3$ and tartaric acid), baking soda ($NaHCO_3$), sodium thiosulfate pentahydrate ($Na_2S2O_3 \cdot 5H_2O$), silica (or silicon dioxide ($SiO_2$)), alumina (or aluminum oxide $Al_2O_3$), calcium oxide (CaO), calcium sulfate (CaSO4), calcium chloride ($CaCl_2$)), sodium carbonate ($Na_2CO_3$), potassium chloride (KCl), magnesium oxide (MgO), zirconium oxide ($ZrO_2$), chromium oxide ($Cr_2O_3$), aluminum hydroxide ($Al(OH)_3$), antimony trioxide ($Sb_2O_3$), antimony pentoxide ($Sb_2O_5$), magnesium hydroxide ($Mg(OH)_2$), a zinc borate compound, a phosphorus compound, a nitrogen-based guanidine compound, or a molybdenum compound, or mixtures thereof.

For example, when the fire-retardant particles 271a are made of silica (silicon dioxide), considering the melting point (1713° C.) of silica, the fire-retardant particles 271a can minimize the transfer of heat or off-gas generated when thermal runaway occurs to another location. In addition, the fire-retardant particles 271a will maintain the shape without any change in the thermal runaway situation of the battery cell.

In another example, the fire-retardant particles 271a may be made of silica gel. The silica gel is a porous material in a powder form made by treating an aqueous solution of sodium silicate (Na2SiO3) with acid. Specifically, the silica gel may be obtained by mixing sodium silicate with an aqueous inorganic acid solution (e.g., sulfuric acid) to form a silica hydrosol and curing the hydrosol into a hydrogel. Considering the above-described typical method of producing the silica gel, the main component (accounting for 50% or more) of the silica gel is silicon dioxide, and as other components, may include aluminum oxide, iron (III) oxide (Fe2O3, iron (III) oxide or ferric oxide) or may further contain sodium. Therefore, the melting point of the silica gel may be about 1600° C. or higher.

Preferably, the silica gel may contain silicon dioxide at 90% or more. In addition, since the silica gel is a porous material, the porosity of the fire-retardant particle 271a may be in the range of 20% or more and 30% or less.

In addition, the fire-retardant particles 271a may be made of aerogel. It is because aerogel has both low thermal conductivity and the property of retaining moisture and expanding in a high-humidity environment.

Considering that the fire-retardant particles 271a are made of a fire-retardant material such as silica gel, alumina gel, or aerogel, the fire-retardant particles 271a may contain silicon dioxide ($SiO_2$).

The fire-retardant particles 271a may be made of other materials than silica gel as long as it has porosity and flame retardant property (heat resistance or fire resistance).

As another example, the fire-retardant particles 271a may indicate a polymer material having a V-0 rating in the 94V test (vertical burning test) of Underwriter's Laboratory (UL), which is the flame-retardant standard for polymer materials.

Specifically, the fire-retardant particles 271a may include a flame-retardant polymer such as, for example, phosphorus-based, halogen-based, and inorganic flame retardants, and preferably, the phosphorus-based flame-retardant material may include a phosphate compound, a phosphonate compound, a phosphinate compound, a phosphine oxide compound, and a phosphazene compound, metal salts thereof, etc. These may be used alone or in combination of two or more types.

In other embodiments, the phosphorus-based flame retardant may be diphenyl phosphate, diaryl phosphate, triphenyl phosphate, tricresyl phosphate, trixyrenyl phosphate, tri(2, 6-dimethylphenyl)phosphate, tri(2,4,6-trimethylphenyl) phosphate, tri(2,4-ditertibutylphenyl) phosphate, tri(2,6-dimethylphenyl) phosphate, bisphenol-A bis (diphenyl phosphate), resorcinol bis(diphenyl phosphate), resorcinol bis [bis(2,6-dimethylphenyl) phosphate], resorcinol bis [bis (2,4-ditertibutylphenyl)phosphate], hydroquinone bis [bis(2, 6-dimethylphenyl)phosphate], hydroquinone bis [bis (2,4-ditertibutylphenyl) phosphate], oligomeric phosphoric acid ester-based compounds, etc., but is not limited thereto. These may be applied alone or in combination of two or more types.

In addition, the fire-retardant particles 271a may comprise a phosphorus-based compound such as monoammonium phosphate (($NH_4$)$H_2PO_4$) or diammonium phosphate (($NH_4$)$_2HPO_4$), or a combination thereof.

Figure 7A:
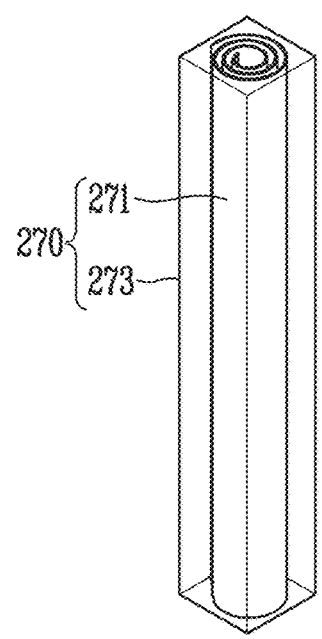
FIG. 7A is still another view of the fire-retardant assembly accommodated in the insertion space and FIG. 7B is a cross-sectional view of the fire-retardant assembly shown in FIG. 7A, according to embodiments of the present disclosure.
Figure 7B:
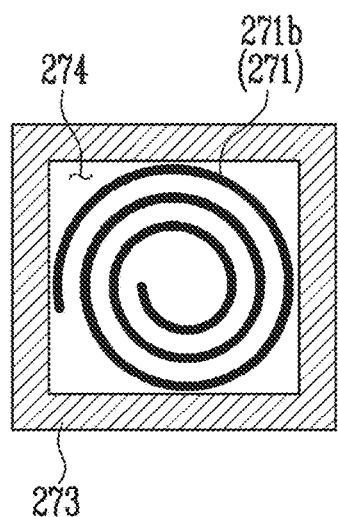

FIG. 7A is still another view of the fire-retardant assembly 270 accommodated in the insertion space 288 (see FIG. 3) and FIG. 7B is a cross-sectional view of the fire-retardant assembly 270 shown in FIG. 7A, according to embodiments of the present disclosure.

Referring to FIGS. 7A and 7B, the fire-retardant assembly 270 may include the fire-retardant member 271 in the form of a roll-shaped fire-retardant sheet 271b, and the exterior material 273 for accommodating the fire-retardant member 271 formed as the roll-shaped fire-retardant sheet 271b therein.

More specifically, the exterior material 273 may include the fire-retardant space 274 therein, and the roll-shaped fire-retardant sheet 271b may be located in the fire-retardant space 274.

The exterior material 273 may be melted at a preset temperature (or an allowable temperature) or higher. That is, when the thermal runaway occurs in at least one of the plurality of battery cells 110 and the temperature increases, the temperature near the battery cell 110 in which thermal runaway has occurred will increase. At this time, when the temperature of the exterior material 273 reaches the above temperature, the exterior material 273 may start to melt. Considering the preset temperature when the thermal runaway occurs in the battery cell 110, the temperature may preferably be in the range of 50° C. or higher and 300° C. or lower.

Unlike an example in which the fire-retardant member 271 is formed of the fire-retardant particles 271a (see FIG. 6B), even when the exterior material 273 melts at the above temperature or higher, the roll-shaped fire-retardant sheet 271b can be maintained even when the size of the roll shape may be changed.

The roll-shaped fire-retardant sheet 271b may be formed by rolling a flat sheet into a roll shape. That is, when the exterior material 273 starts to melt, the exterior material 273 restraining the roll-shaped fire-retardant sheet 271b is removed or disappears, and thus similar to a spiral spring, the diameter of the roll-shaped fire-retardant sheet 271b may increase. Therefore, the space of the roll-shaped fire-retardant sheet 271b in the insertion space 288 will be greater than when restrained by the exterior material 273. It will be effective in delaying or blocking heat transfer through the insertion space 288.

Regardless of the case in which the fire-retardant member 271 is formed of the fire-retardant particles 271a or the roll-shaped fire-retardant sheet 271b, the movement and deformation of the fire-retardant member 271 are limited to only the internal space of the exterior material 273.

However, when the exterior material 273 starts to melt at the above temperature or higher, while the fire-retardant particles 271a may freely move in the insertion space 288, the roll-shaped fire-retardant sheet 271b can maintain the original location in the insertion space 288.

To this end, the material of the roll-shaped fire-retardant sheet 271b may include any one of the materials described for the fire-retardant particles 271a or a combination thereof.

Likewise, the melting temperature of the roll-shaped fire-retardant sheet 271b will preferably be higher than the allowable temperature. The reason is that the roll-shaped fire-retardant sheet 271b should be prevented from burning or melting at the allowable temperature or higher.

The exterior material 273 may be made of a material that melts at the allowable temperature or higher while accommodating the fire-retardant member 271. More specifically, the exterior material 273 may be made of a heat-resistant (fire-retardant or flame-retardant) material that does not melt up to the allowable temperature. For example, the exterior material 273 may be made of a polymer such as polypropylene (PP), polyethylene (PE), rubber, cellulose, or a resin. Alternatively, the exterior material 273 may be made of a foam-type polymer.

The exterior material 273 allows the fire-retardant assembly 270 to maintain a constant shape regardless of the shape of the fire-retardant member 271. Even when the fire-retardant member 271 is in a liquid state, the fire-retardant assembly 270 can maintain a preset three-dimensional shape by the exterior material 273.

In addition, by obtaining the effect of coating the outer surface of the fire-retardant assembly 270 with the exterior material 273, it is possible to enhance the moisture resistance or moisture-proof effect of the fire-retardant assembly 270.

Figure 8:
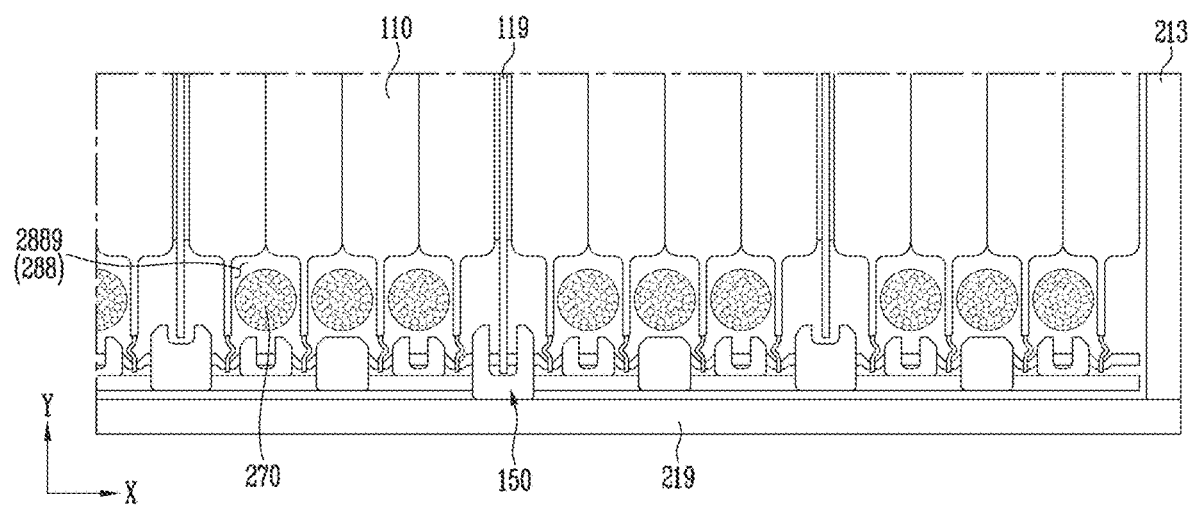
FIG. 8 is a cross-sectional top view of the battery assembly according to an embodiment the present disclosure.

FIG. 8 is a cross-sectional top view of the battery assembly 200 according to an embodiment the present disclosure.

Referring to FIGS. 2 and 8, FIG. 8 shows a portion (specifically, an area in which the accommodation body 219 meets one of the end plates 212 and 213) viewing the accommodation body 219 from the top after removing the accommodation cover 215.

As described above, the movement of the fire-retardant particle 271a (see FIG. 6B), which is an example of the fire-retardant member 271, may be suppressed by the exterior material 273, and at least some of the fire-retardant particles 271a may be released from the restricted coupling by the exterior material 273 due to the melting of the exterior material. On the other hand, the roll-shaped fire-retardant sheet 271b may expand due to the melting of the exterior material 273 and fill the insertion space 288 better than when restrained by the exterior material 273.

Referring to FIG. 8, the insertion space 288 may be partitioned into the plurality of separation spaces 2889 (see FIG. 5), and the plurality of fire-retardant assemblies may be inserted into at least some of the plurality of separation spaces 2889.

The battery assembly 200 may further include the heat blocking member 119 located between the battery cells 110 in the stacking direction (e.g., the X-axis direction) of the plurality of battery cells 110. Since the heat blocking member 119 extends in a direction (e.g., the Y-axis direction) in which the lead tab units 111 and 112 protrude among directions perpendicular to the stacking direction and is connected to the busbar assembly 150, the fire-retardant assembly 270 may not fill all the plurality of separation spaces 2889.

However, when the heat blocking member 119 is not present, the fire-retardant assembly 270 may be inserted into each of the plurality of separation spaces 2889.

Although FIG. 8 shows an example in which the fire-retardant member 271 (see FIG. 6C) is the fire-retardant particle 271a (see FIG. 6B), alternatively, the above description may also be applied to a case in which the fire-retardant member 271 is the roll-shaped fire-retardant sheet 271b (see FIG. 7B).

Figure 9:
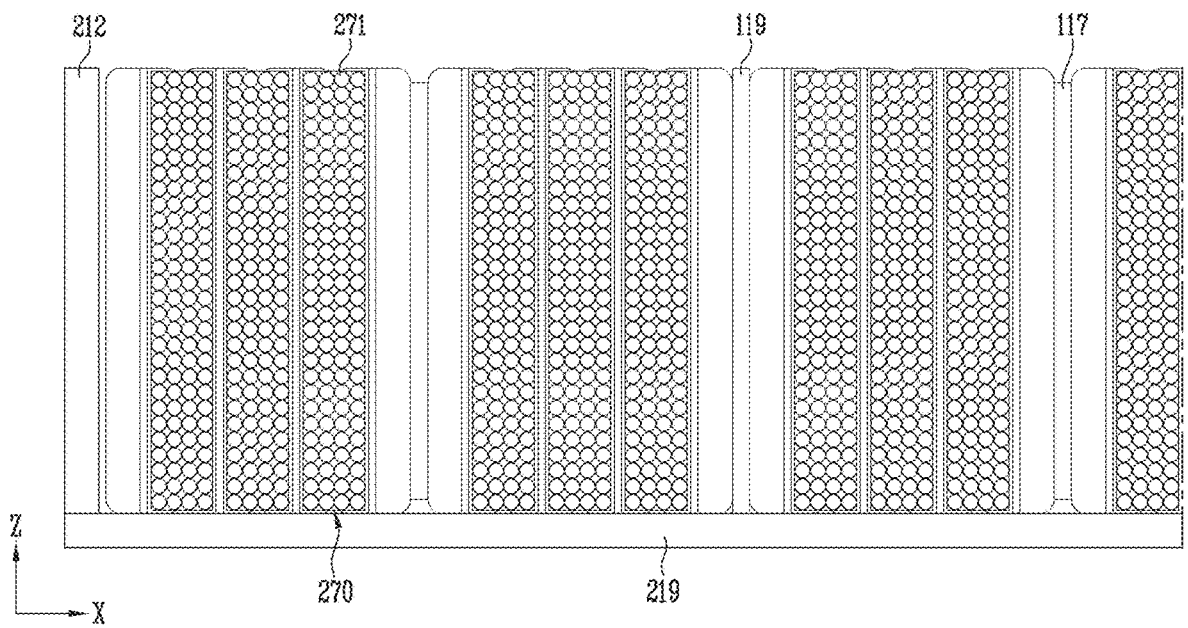
FIG. 9 is a side view of the battery assembly according to an embodiment of the present disclosure.

FIG. 9 is a side view of the battery assembly 200 according to an embodiment of the present disclosure.

Specifically, referring to FIGS. 2 and 9, FIG. 9 shows an area in contact with any one of the end plates 212 and 213 when viewing the battery assembly 200 after removing the body side surfaces 2191 and 2192 and the busbar assembly 150.

Referring to FIG. 9, the insertion space 288 may include the plurality of separation spaces 2889, and the fire-retardant assembly 270 may be located in the separation spaces 2889 of at least some of the plurality of separation spaces 2889. The fire-retardant assembly 270 can delay the thermal runaway of the battery cell 110. The fire-retardant assembly 270 may not be added in each one of the plurality of separation spaces 2889.

Referring to FIG. 9, an example in which the fire-retardant member 271 is the fire-retardant particle 271a (see FIG. 6B) is shown. However, as described above, the fire-retardant member 271 may be the roll-shaped fire-retardant sheet 271b (see FIG. 7B).

Figure 10A:
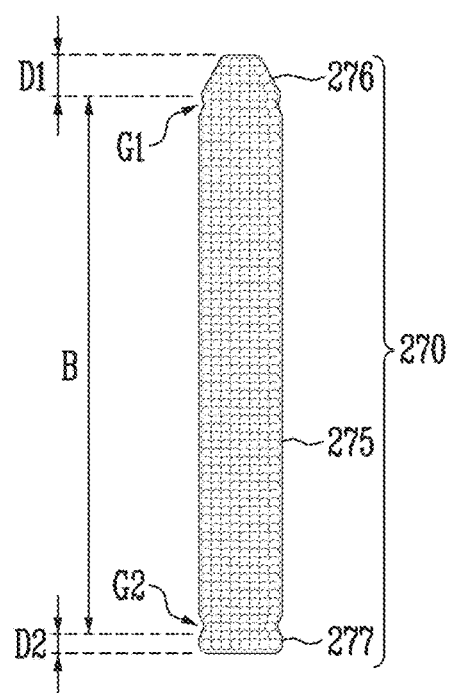
FIG. 10A is another view of the fire-retardant assembly accommodated in the insertion space.
Figure 10B:
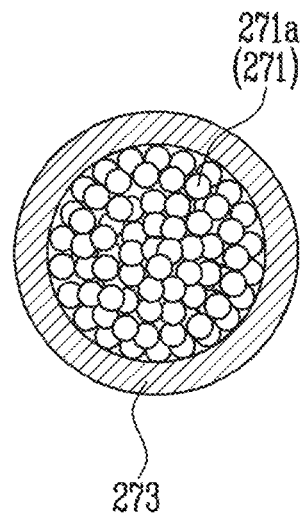
FIG. 10B is a cross-sectional view of the fire-retardant assembly shown in FIG. 10A.
Figure 10C:
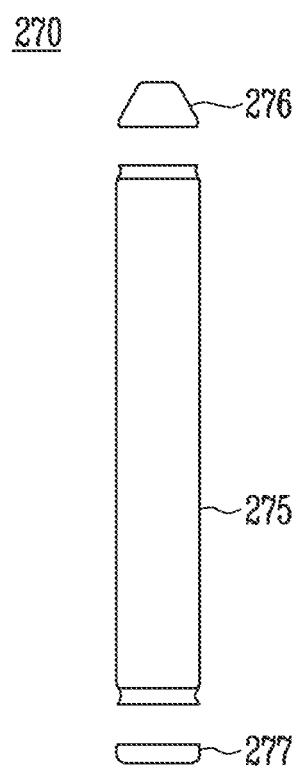
FIG. 10C is an exploded view of an exterior material.
Figure 10D:
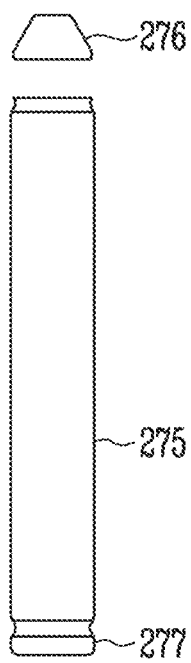
FIG. 10D is another exploded view of an exterior material, according to embodiments of the present disclosure.

FIG. 10A is another view of the fire-retardant assembly 270 accommodated in the insertion space 288, FIG. 10B is a cross-sectional view of the fire-retardant assembly 270 shown in FIG. 10A, and FIG. 10C is an exploded view of an exterior material 273. FIG. 10D is another exploded view of an exterior material 273, according to embodiments of the present disclosure.

As described above, the battery assembly 200 according to an embodiment of the present disclosure may include the plurality of battery cells 110 arranged by being stacked in the preset stacking direction, the accommodation case 210 for accommodating the plurality of battery cells 110, the insertion space 288 formed between the plurality of battery cells 110 and the accommodation case 210 in the stacking direction, and the fire-retardant assembly 270 located in the insertion space 288.

Referring to FIGS. 10A and 10B, the fire-retardant assembly 270 may include a pillar-shaped exterior material 273 for accommodating a bead-shaped fire-retardant member 271 containing the fire-retardant material and extending in the height direction of the accommodation case 210. Considering the function and form of the fire-retardant member 271 and the exterior material 273, the fire-retardant assembly 270 may be referred to as a fire-retardant capsule or fire-mitigation capsule, or an FR (or FM) capsule.

Considering FIG. 10B, the fire-retardant member 271 may be the fire-retardant particles 271a.

A ratio at which the fire-retardant member 271 fills the exterior material 273 may be changed depending on a usage environment. That is, a filling rate of the fire-retardant member 271 may be changed in consideration of a location at which the fire-retardant assembly 270 is located in the accommodation case 210. The filling rate may indicate the percentage of a volume of the fire-retardant member 271 to an internal volume of the exterior material 273.

The height of the fire-retardant assembly 270 in the height direction of the accommodation case 210 may be greater than the length (or the diameter) of the fire-retardant assembly 270 in the stacking direction. That is, the fire-retardant assembly 270 may have a cylindrical shape formed to extend in the height direction of the accommodation case 210.

In addition, considering the size of the insertion space 288, the length (or the diameter) of the fire-retardant assembly 270 in the stacking direction may be smaller than or equal to the thickness of any one of the plurality of battery cells, which is to allow the fire-retardant assembly 270 to be easily inserted into the insertion space 288.

The fire-retardant assembly 270 may preferably have a cylindrical shape. Therefore, the length of the fire-retardant assembly 270 in the stacking direction may indicate the diameter of the fire-retardant assembly 270 whose end face has a circular shape.

The fire-retardant assembly 270 or at least one of both end portions 276 and 277 of the exterior material 273 may be provided in a tapered shape.

The above is to allow the fire-retardant assembly 270 to be easily inserted into the insertion space 288. That is, when the fire-retardant assembly 270 is inserted into the insertion space 288, at least one end portion of the fire-retardant assembly 270 may have a tapered shape to allow the fire-retardant assembly 270 to be guided into the insertion space 288.

Referring to FIG. 10B, the exterior material 273 may further include the fire-retardant space 274 formed by the exterior material 273 to accommodate the fire-retardant member 271 or the fire-retardant particles 271a.

FIG. 10A shows an example in which the exterior material 273 has a cylindrical shape. However, the shape of the exterior material 273 is not limited thereto and may have any shape as long as it may be inserted into the insertion space 288.

In the drawings of the present specification, the fire-retardant member 271 is spherical for convenience, and the shape of the fire-retardant member 271 is not limited to a sphere. Therefore, the fire-retardant member 271 may have an amorphous shape. In addition, the fire-retardant member 271 is not limited to one size, but may be a shape in which various sizes of the fire-retardant members 271 are mixed. In addition, the fire-retardant member 271 is shown exaggerated from the actual size for description.

Referring to FIG. 10C, the exterior material 273 may include a pipe-shaped body portion 275 extending in the height direction of the accommodation case 210, the first end portion 276 coupled to an upper side of the body portion 275 to close one end of both open ends of the body portion 275, and the second end portion 277 coupled to a lower side of the body portion 275 to close the other open end.

In FIG. 10C, although the first end portion 276 and the body portion 275 are shown separately, alternatively, the first end portion 276 and the body portion 275 may be molded integrally. Thereafter, the fire-retardant member 271 may fill the first end portion 276 and the body portion 275, and the second end portion 277 may be coupled to the body portion 275 to close the open end of the body portion 275. That is, the second end portion 277 may serve as a lid.

That is, the exterior material 273 may include the cylindrical body portion 275 whose at least one end of both ends is open, and the end portions 276 and 277 coupled to the body portion 275 to close the at least open one end.

Referring to FIGS. 10A, 10B, and 10C, a length B of the body portion 275 may be greater than a length D1 of the first end portion 276 and a length D2 of the second end portion 277.

In addition, the body portion 275 may have a cylindrical shape. The fire-retardant assembly 270 may further include grooves G1 and G2 recessed inward along a circumferential surface of the cylindrical body portion 275. The grooves G1 and G2 may be formed between the first end portion 276 and the body portion 275 and between the second end portion 277 and the body portion 275, which is to prevent damage to the battery cell 110 adjacent to the fire-retardant assembly 270 when the fire-retardant assembly 270 is inserted.

In addition, the first end portion 276 may have a tapered shape in a direction away from the body portion 275.

That is, at least one of both end portions of the exterior material may have a tapered shape, for allowing the fire-retardant assembly 270 to be easily inserted into the insertion space 288 using the tapered end portion.

Alternatively, the second end portion 277 may include a flat end face. That is, the second end portion 277 may include an end face 277a (see FIG. 11) disposed parallel to the body bottom surface 2194, which is the bottom surface of the accommodation case 210.

Referring to FIGS. 10A and 10B, the plurality of fire-retardant members 271 are provided, mixed, and accommodated in the exterior material 273.

As described through FIGS. 6A and 6B, the fire-retardant member 271 may be a solid filler (or the fire-retardant particles 271a, see FIG. 6B) provided in the form of solid particles, powder, granules, pellets, or beads, which is to prevent or delay flame transfer or heat transfer through the insertion space 288 when thermal runaway occurs in any battery cell 110.

Referring to FIG. 10D, unlike FIG. 10C, one end of the exterior material 273 may have a closed shape. That is, the second end portion 277 may be formed integrally with the body portion 275. Therefore, the first end portion 276 may be coupled to the body portion 275 to close the open end of the body portion 275.

Alternatively, the first end portion 276 may be formed integrally with the body portion 275, and the second end portion 277 may be coupled to the body portion 275 to close the other open end of the body portion 275.

As a result, the exterior material 273 may include the cylindrical body portion 275 whose at least one end is open, and the end portions 276 and/or 277 coupled to the body portion to close at least one open end.

Since the size (or shape) and material of the fire-retardant member 271 are the same as those of the fire-retardant member 271 shown in FIGS. 6A to 6C, detailed descriptions thereof are omitted.

Figure 11:
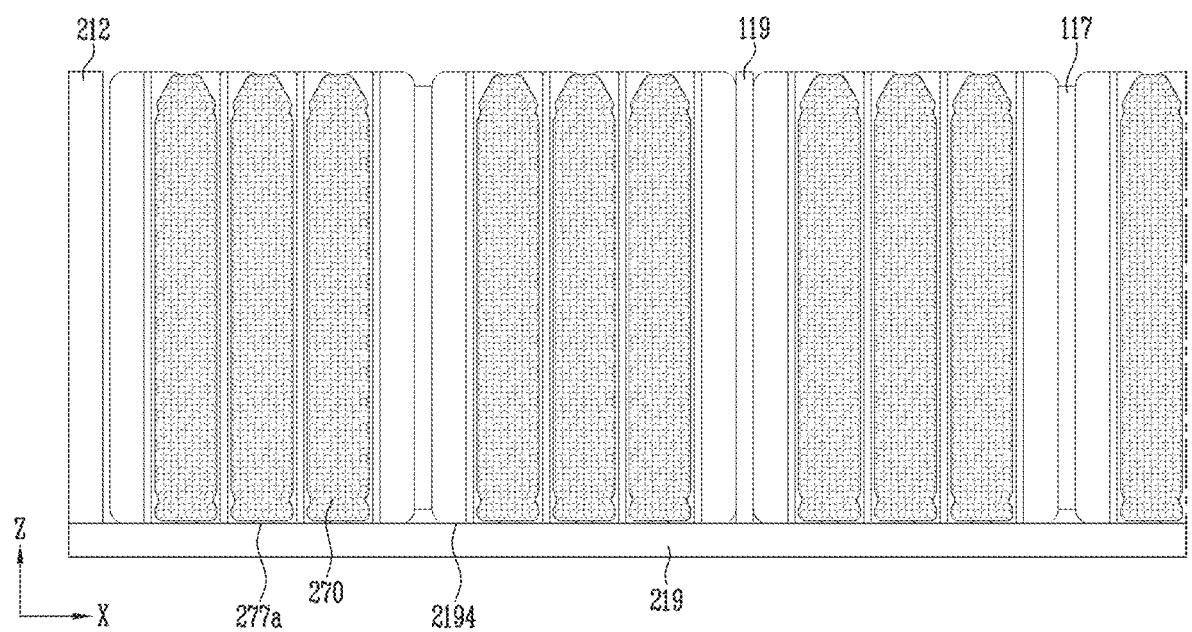
FIG. 11 is another side view of the battery assembly according to an embodiment of the present disclosure.

FIG. 11 is another side view of the battery assembly 200 according to an embodiment of the present disclosure.

Specifically, referring to FIGS. 2 and 11, FIG. 11 shows an area in contact with any one of the end plates 212 and 213 when viewing the battery assembly 200 after removing the body side surfaces 2191 and 2192 and the busbar assembly 150.

Referring to FIGS. 1, 2, and 11, the insertion space may be partitioned into the plurality of separation spaces 2889 by each of the lead tab units 111 and 112 located outside the plurality of battery cells 110 to connect the busbar 170 with the plurality of battery cells 110, the plurality of fire-retardant assemblies 270 may be provided and inserted into at least some of the plurality of separation spaces 2889.

FIG. 11 is an exemplary view of the plurality of fire-retardant assemblies 270 inserted one-to-one into the plurality of separation spaces 2889 but disposed only in at least some of the plurality of separation spaces 2889. When the fire-retardant assembly 270 may delay the thermal runaway of the battery cell 110, the fire-retardant assembly 270 does not necessarily need to be located in each of the plurality of separation spaces 2889.

Referring to FIG. 11, the plurality of fire-retardant assemblies 270 may have different filling rates of the fire-retardant members 271 filling each exterior material 273, which is to consider the location in the battery assembly 200 at which thermal runaway occurs frequently. That is, the filling rate of the fire-retardant member 271 filling any one located on a central portion of the accommodation case 210 among the plurality of fire-retardant assemblies 270 may differ from the filling rate of the fire-retardant member 271 filling any one fire-retardant assembly 270 located on the side surface portions of the accommodation case 210.

Referring to FIGS. 2 and 11, the accommodation case 210 may include an open upper surface 2195 and further include the accommodation body 219 for accommodating the plurality of battery cells 110 through the open upper surface 2195, and the accommodation cover 215 coupled to the accommodation body 219 to cover the open upper surface 2195.

In addition, the fire-retardant assembly 270 or one end portion closer to the accommodation cover 215 than the accommodation body 219 among both end portions of the exterior material 273 may have a tapered shape.

Figure 12:
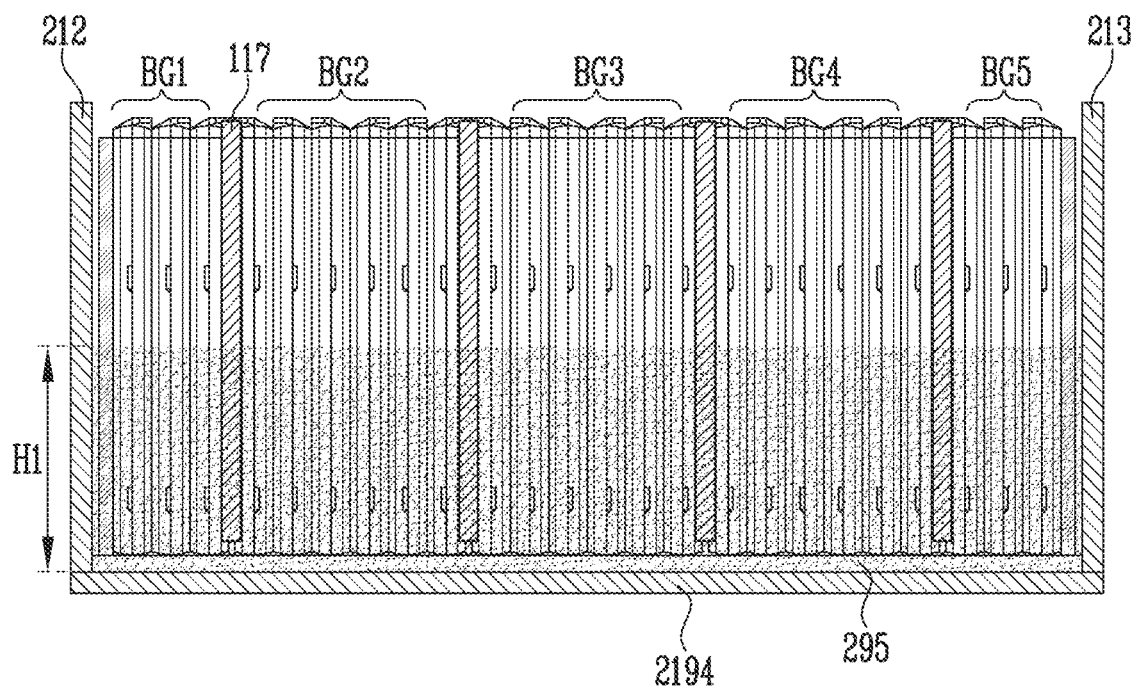
FIG. 12 is a schematic view illustrating that the exterior material melts and fire-retardant particles, which are an example of a fire-retardant member, are stacked granularly in the insertion space.

FIG. 12 is a schematic view illustrating that the exterior material 273 melts and the fire-retardant particles 271a (see FIG. 6B), which are an example of the fire-retardant member 271, are stacked granularly in the insertion space 288.

Specifically, FIG. 12 shows an example in which the exterior material 273 melts at the allowable temperature or higher and the fire-retardant particles 271a are separated granularly to fill the insertion space 288 up to a preset filling height H1 in the height direction of the accommodation case 210 or the accommodation body 219.

The insertion space 288 may be partitioned into the plurality of separation spaces 2889, and the plurality of fire-retardant assemblies 270 may be inserted into at least some of the plurality of separation spaces 2889. The volume of each of the insertion spaces 288 may be greater than the total volume of the fire-retardant assemblies 270 inserted into the plurality of separation spaces 2889.

As a result, even when it is assumed that the exterior material 273 fully melts during thermal runaway of the plurality of battery cells 110, the fire-retardant particles 271a may not fill the insertion space 288 up to the uppermost end in the height direction of the battery cell 110.

That is, assuming that the battery assembly 200 reaches the allowable temperature and the exterior material 273 fully melts, the fire-retardant particles 271a may granularly fill the insertion space 288 up to the filling height H1.

Referring to FIG. 12, the filling height may be a height marked by H1 from the body bottom surface 2194, which is the bottom surface of the accommodation body 219.

For example, an example in which the filling height H1 shown in FIG. 12 is the height corresponding to when 50% of the volume of the insertion space 288 is filled with the fire-retardant particles 271a after the exterior material 273 melts is shown.

The battery assembly 200 may further include the heat sink unit 295 between the plurality of battery cells 110 and the body bottom surface 2194. The heat sink unit 295 may be made of a material that may be cured when a preset elapse time elapses after the plurality of battery cells 110 are accommodated after a liquid is first applied onto the body bottom surface 2194 before the plurality of battery cells 110 are accommodated.

The thickness of the heat sink unit 295 may be negligible compared to the height of the accommodation body 219 or the filling height H1.

The battery assembly 200 may have the end plates 212 and 213 located at both ends of the plurality of battery cells 110 in the stacking direction. In addition, some adjacent to each other among the plurality of battery cells 110 may be grouped to form the battery groups BG1 to BG5. The plurality of battery cells 110 in one battery group may be disposed at the same polarity and connected in parallel. Therefore, each of the battery groups BG1 to BG5 may have a different pole arrangement from the adjacent battery groups BG1 to BG5.

In addition, the battery assembly 200 may further include the heat blocking member 119 (see FIG. 3) or the buffering member 117 between the plurality of battery groups BG1 to BG5.

Unlike that shown in FIG. 12, when the fire-retardant member 271 is provided as the roll-shaped fire-retardant sheet 271b, the roll shape of the fire-retardant sheet 271b may expand in the diameter direction when the exterior material 273 melts, and the appearance of the roll shape can be maintained.

Figure 13:
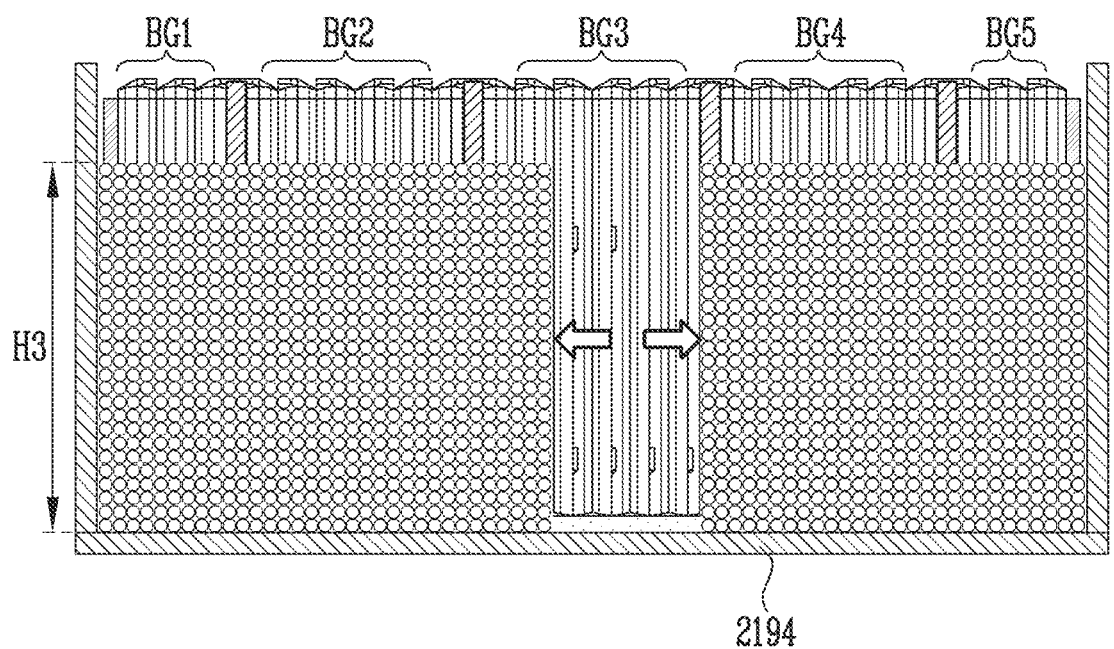
FIG. 13 is a view of the movement of the fire-retardant particles, which are an example of the fire-retardant member, due to flame or hot gas according to an embodiment of the present disclosure.

FIG. 13 is a view of the movement of the fire-retardant particles 271a (see FIG. 6B), which are an example of the fire-retardant member 271 (see FIG. 6B), due to flame or hot gas according to an embodiment of the present disclosure.

Referring to FIG. 13, when the exterior material 273 restraining the fire-retardant particles starts to melt at the allowable temperature or higher, the fire-retardant particles may not maintain the appearance of the fire-retardant assembly 270 and may be sequentially stacked from the body bottom surface 2194 by gravity.

That is, since the fire-retardant particles 271a are accommodated in the exterior material 273, when the exterior material 273 is removed, the fire-retardant particles 271a accumulate in the insertion space 288 rather than being coupled.

FIG. 13 schematically shows an example in which the exterior materials 273 of all fire-retardant assemblies 270 inserted into the insertion spaces 288 melt. The shape of the fire-retardant particles 271a is shown exaggerated in size and as being a spherical shape for description. In addition, for convenience, it is assumed that all exterior materials 273 are in a melted state.

Alternatively, in any one battery cell 110, the exterior material 273 may first melt in any one insertion space 288 in which the corresponding battery cell 110 is located. Therefore, some of the plurality of fire-retardant assemblies 270 may melt, and others can maintain the three-dimensional shape of the fire-retardant assemblies 270.

In addition, in any one fire-retardant assembly 270, some regions may be melted, while other portions may still maintain the appearance of the fire-retardant assembly 270.

When the temperature of the fire-retardant assembly 270 reaches the allowable temperature or higher, the exterior material 273 starts to melt, and as shown in FIGS. 12 and 13, the fire-retardant particles, which are an example of the fire-retardant member 271, may be separated granularly and stacked freely.

The plurality of fire-retardant particles may be provided.

Since the exterior material 273 restraining the fire-retardant particles has been removed, the fire-retardant particles, which are an example of the fire-retardant member 271, may move freely. Therefore, due to the flow of flame or off-gas generated during thermal runaway, the fire-retardant particles, which are an example of the fire-retardant member 271, may receive a force and move to other locations.

As described above, since the plurality of insertion spaces 288 communicate with each other, when flame or off-gas moves (in an arrow direction) from any one insertion space 288 in which the battery cell 110 in which thermal runaway has occurred is located toward another battery cell 110, the fire-retardant particles, which are an example of the fire-retardant member 271, may move from the insertion space 288 corresponding to the battery cell 110 in which thermal runaway has occurred to another insertion space 288.

For example, referring to FIG. 13, when thermal runaway occurs in one battery cell (e.g., any one battery cell belonging to BG3), a temperature of an area adjacent to the one battery cell will increase first. Therefore, the exterior material 273 of the fire-retardant assembly 270 adjacent to the one battery cells 110 in which the thermal runaway has occurred may melt. Therefore, the restrained fire-retardant particles, which are an example of the fire-retardant member 271, may freely move due to the melting of the exterior material 273.

Therefore, when the flame or hot gas spreads to adjacent battery groups, the fire-retardant particles, which are an example of the granular fire-retardant member 271, may move to sides along the flame or hot gas. FIG. 13 schematically shows this for description. Therefore, since the granular fire-retardant particles move to and fill the remaining spaces in which flame or hot gas does not spread yet among the insertion spaces 288, it is possible to delay the transfer of the flame or hot gas.

That is, the fire-retardant particles, which are an example of the fire-retardant member 271 and which have been separated granularly, and may move freely due to the melting of the exterior material 273, may move to the insertion space 288 corresponding to the location of the battery cell 110 in which the thermal runaway has not occurred and which may be operated normally due to the pressure generated upon the occurrence of the thermal runaway in any one of the plurality of battery cells 110.

Therefore, referring to FIG. 13, the fire-retardant particles, which are an example of the fire-retardant member 271, may move to other areas excluding the insertion space 288 corresponding to the area of the third battery group BG3. Therefore, a filling height H3 of the fire-retardant particles may be greater than the filling height H1 of the fire-retardant particles in FIG. 12.

It is only an example, and the filling height H3 of the fire-retardant particles, which are an example of the fire-retardant member 271, may be changed depending on a transfer rate of the flame and a venting speed of the off-gas.

Figure 14:
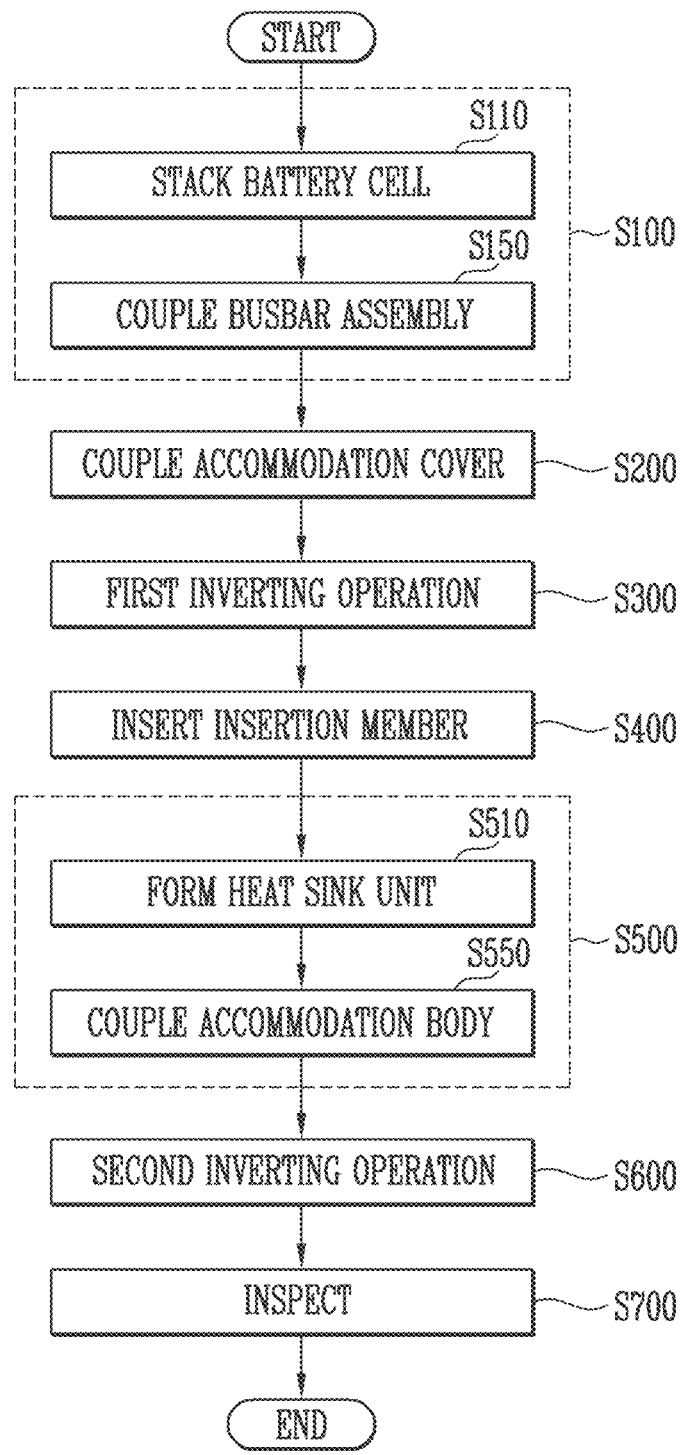
FIG. 14 is a flowchart of an example of a process of manufacturing the battery assembly according to an embodiment of the present disclosure.

FIG. 14 is a flowchart of a process of manufacturing the battery assembly 200 according to an embodiment of the present disclosure.

Referring to FIG. 14, a method of assembling the battery assembly 200 according to an embodiment of the present disclosure may include stacking the plurality of battery cells 110 in the preset stacking direction (S110), coupling the plurality of stacked battery cells 110 to the accommodation cover 215 (S200), inserting the fire-retardant assembly 270 including the bead-shaped fire-retardant member 271 including the fire-retardant material in the insertion space 288 and the exterior material 273 for accommodating the fire-retardant member 271 therein and extending in the height direction of the accommodation case 210 (S400), and coupling the accommodation body 219 coupled to the accommodation cover 215 to form the accommodation case 210 to the accommodation cover 215 (S500).

The method of assembling the battery assembly 200 according to an embodiment of the present disclosure may include, after the stacking of the plurality of battery cells (S110), coupling the busbar assembly 150 electrically connected to the plurality of battery cells 110 (S150).

The stacking of the plurality of battery cells 110 (S110) and the coupling of the busbar assembly 150 may be collectively referred to as assembling the cell stack 100 (S100).

Specifically, the assembling of the cell stack 100 (S100) may further include, after the stacking of the plurality of battery cells 110 (S110), stacking the plurality of battery cells 110 and the buffering member 117 and/or the heat blocking member 119 that are located between the plurality of battery cells 110 (not shown).

In addition, the assembling of the cell stack 100 (S100) may further include stacking each of the end plates 212 and 213 located at both ends of the plurality of battery cells 110 in the stacking direction in which the plurality of battery cells 110 are stacked (not shown).

The assembling of the cell stack 100 (S100) may further include, after the stacking (S110) is finished, connecting the busbar assembly 150 to the stacked battery cells 110 (S150). Through the connecting of the busbar assembly 150 (S150), the plurality of battery cells 110 and the busbar assembly 150 may be electrically connected by being welded.

Thereafter, the assembly method of the present disclosure may include coupling the accommodation cover 215 to the cell stack 100 (S200). The reason for assembling the accommodation cover 215 before the accommodation body 219 is to protect the busbar assembly 150 located to face the accommodation cover 215 during the assembly process.

Thereafter, the assembly method of the present disclosure may perform a first inverting operation (S300) of inverting the battery assembly 200 being assembled. That is, the assembly method of the present disclosure may further include, before the inserting of the fire-retardant assembly 270 into the insertion space 288 (S400), the first inverting operation (S300) of coupling the plurality of stacked battery cells 110 to the accommodation cover 215 and then inverting the battery assembly 200. That is, through the first inverting operation (S300), the accommodation cover 215 is located under the plurality of battery cells 110 in a direction in which gravity acts.

The reason for inverting the battery assembly 200 being assembled is to locate the fire-retardant assembly 270 in the insertion space 288. Since it is difficult to insert the fire-retardant assembly 270 from the top due to the already coupled accommodation cover 215, the battery assembly 200 being assembled is inverted to locate the fire-retardant assembly 270.

The assembly method of the present disclosure may proceed to the inserting of the fire-retardant assembly 270 (S400) after the first inverting operation (S300).

When the shape of the fire-retardant assembly 270 is as shown in FIG. 10A, in the inserting of the fire-retardant assembly 270 (S400) of the assembly method of the present disclosure, the first end portion 276 may be inserted into the insertion space 288 to be disposed toward the accommodation cover 215 prior to the second end portion 277.

Thereafter, the assembly method of the present disclosure may further include coupling the accommodation body 219 to the accommodation cover 215 (S500).

The coupling of the accommodation body to the accommodation cover (S500) may include, after the first inverting operation (S300), coupling the accommodation body 219 to the accommodation cover 215 and the cell stack 100 in the inverted state (S550).

In addition, the coupling of the accommodation body 219 to the accommodation cover 215 (S500) of the assembling method of the present disclosure may further include, before the coupling of the accommodation body 219 to the accommodation cover 215 and the cell stack 100 in the inverted state, forming the heat sink unit 295 on the body bottom surface 2194 forming the bottom surface of the accommodation body 219 (S510).

The heat sink unit 295 may be formed on the body bottom surface 2194 and may be in contact with the cell stack 100 when the cell stack 100 is coupled to the accommodation body 219.

After the accommodation body 219 and the accommodation cover 215 are coupled, the assembly method of the present disclosure may include a second inverting step (S600) of re-inverting the battery assembly 200 so that the accommodation cover 215 is located at the top.

When the shape of the fire-retardant assembly 270 is the form shown in FIG. 10A, through the second inverting operation (S600), the first end portion 276 may be disposed at the top and the second end portion 277 may be disposed at the bottom as in an example of FIG. 11.

The assembling method of the battery assembly 200 according to an embodiment of the present disclosure is described using an example in which the accommodation cover 215 is located at the top, but is not limited thereto. That is, the first inverting operation (S300) and the second inverting operation (S600) may indicate both vertical inversion and horizontal inversion. Alternatively, "inverting operation" may indicate that the accommodation cover 215 is located to face one direction and then face a direction opposite to the one direction by the inverting operation.

Thereafter, the assembly method of the present disclosure may perform inspecting the battery assembly 200 (S700).

Figure 15:
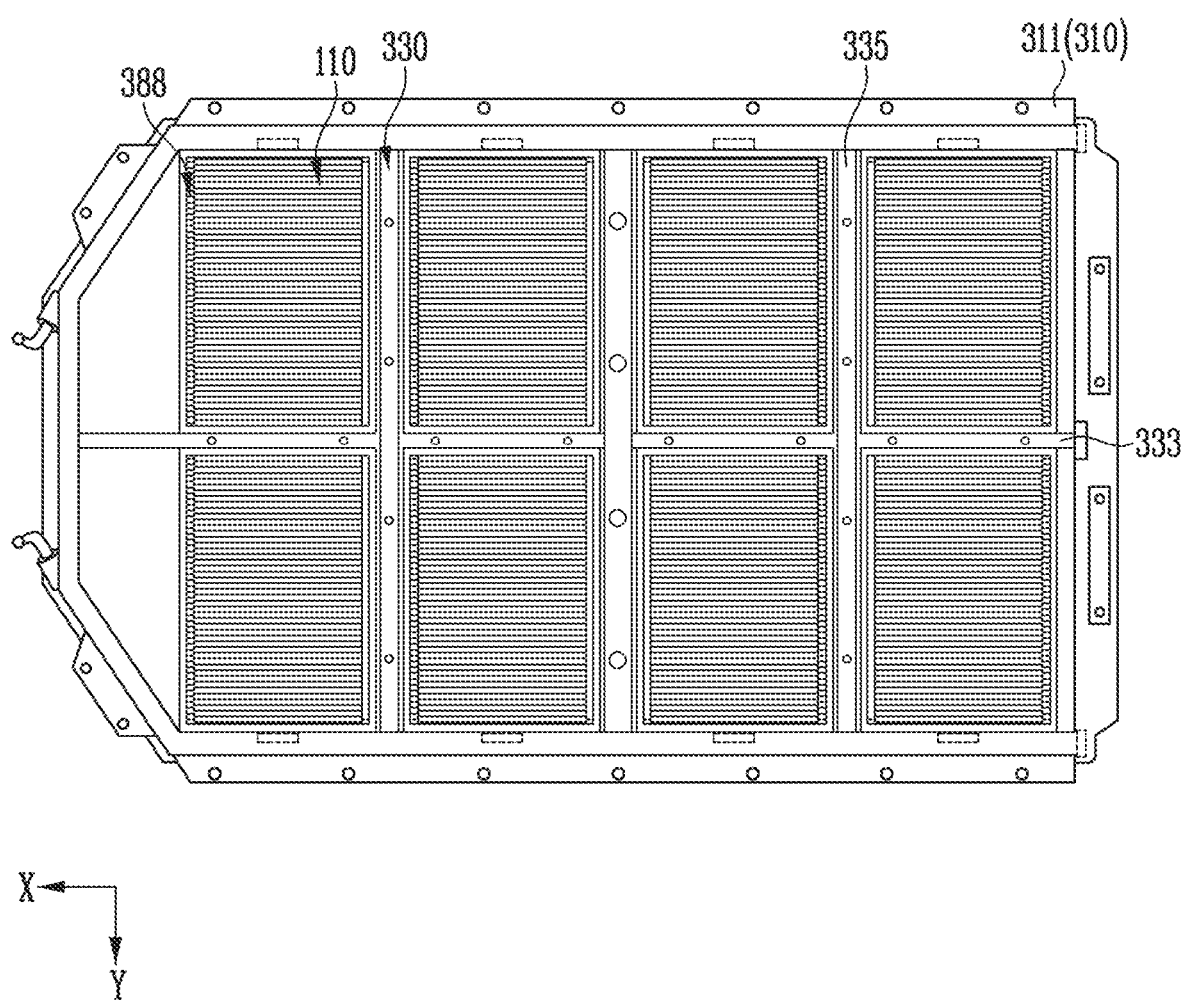
FIG. 15 is another exemplary view of the battery assembly according to an embodiment of the present disclosure.

FIG. 15 is another view of a battery assembly 300 according to an embodiment of the present disclosure.

Although the battery assembly 200 is described based on the battery assembly, FIG. 15 shows another example of the battery assembly 300 provided in the form of a battery pack. That is, the battery assembly 200 may be configured in the form of a CTP structure in which the plurality of battery cells 110 are accommodated in the form of a pack in a state of omitting the battery assembly.

The battery assembly 300 may include the plurality of battery cells 110 arranged by being stacked in the preset stacking direction, an accommodation case 310 for accommodating the plurality of battery cells, an insertion space 388 formed between the plurality of battery cells 110 and the accommodation cases in the stacking direction, and the fire-retardant assembly (not shown) located in the insertion space.

The fire-retardant assembly 270 (see FIG. 6A) may include the fire-retardant member 271 and the exterior material 273 (see FIG. 6A) for accommodating the fire-retardant member 271 therein. In FIG. 13, the fire-retardant assembly 270 is omitted for the description of the accommodation case 210.

The accommodation case 310 may include an accommodation body 311 for accommodating the plurality of battery cells 110 and an accommodation cover (not shown) coupled to the accommodation body 311. In addition, the accommodation case 310 may further include a partition 330 for partitioning the insertion space 388.

The partition 330 may further include a first frame 333 and a second frame 335 for partitioning the plurality of battery cells 110 horizontally and vertically, respectively. The first frame 333 and the second frame 335 are used to prevent the deformation of the accommodation body 311 and support and distinguish the plurality of battery cells 110.

Figure 16A:
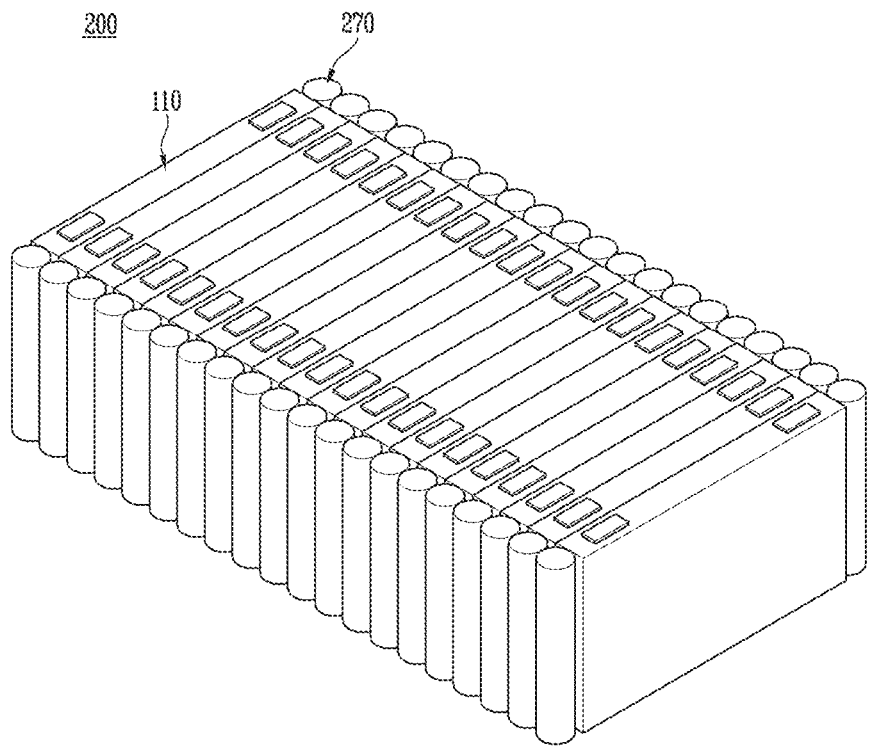
FIG. 16A is a view of a portion of another example of the battery assembly according to an embodiment of the present disclosure.
Figure 16B:
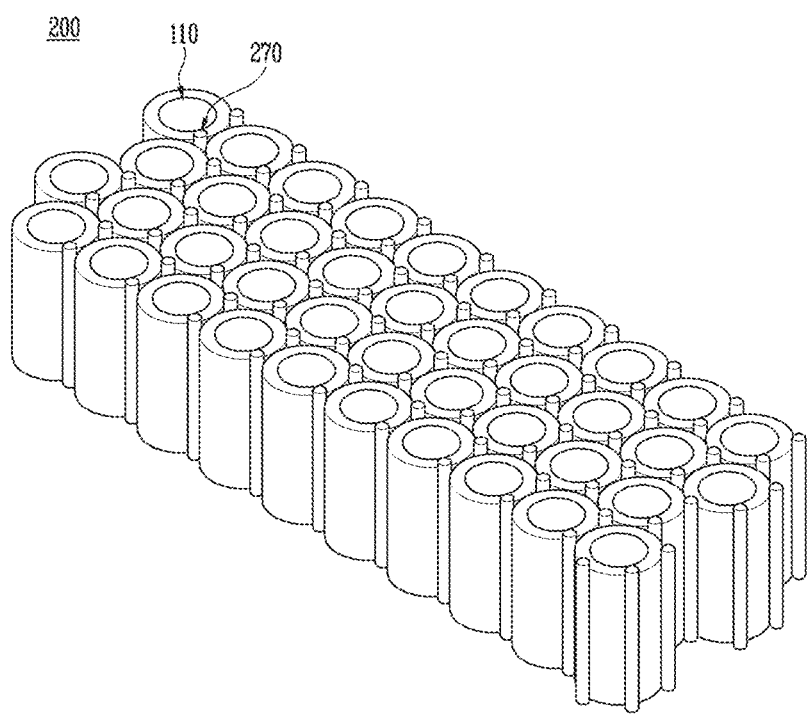
FIG. 16B is a view of a portion of still another example of the battery assembly according an embodiment of to the present disclosure.

FIG. 16A is a view of a portion of another example of the battery assembly according to an embodiment of the present disclosure. FIG. 16B is a view of a portion of still another example of the battery assembly 200 according to an embodiment of the present disclosure.

Referring to FIG. 16A, the shape of the battery cell included in the battery assembly 200 according to an embodiment of the present disclosure may be a prismatic battery cell. That is, the battery assembly 200 according to an embodiment of the present disclosure may include the plurality of battery cells 110 stacked in the preset direction, and the fire-retardant assembly 270 disposed with the plurality of battery cells 110 interposed therebetween. For convenience, the accommodation case for accommodating the plurality of battery cells 110 and the fire-retardant assembly 270 is omitted.

A terminal of the prismatic battery cell 110 may be located on an upper portion of the prismatic battery cell 110 in the height direction of the accommodation case. Therefore, the busbar for electrically connecting the plurality of battery cells 110 may be located on the upper portions of the plurality of battery cells 110.

The battery assembly 200 may include the fire-retardant assembly 270 disposed with the plurality of battery cells interposed therebetween. For convenience, the accommodation case for accommodating the plurality of battery cells 110 and the fire-retardant assembly 270 is omitted.

Referring to FIG. 16B, the shape of the battery cell included in the battery assembly 200 according to an embodiment of the present disclosure may be a cylindrical battery cell. That is, the battery assembly 200 according to an embodiment of the present disclosure may include the plurality of battery cells 110, the accommodation case (not shown) for accommodating the plurality of battery cells 110, and the fire-retardant assembly 270 disposed between the plurality of battery cells 110 or between the plurality of battery cells 110 and the accommodation case 210.

In the cylindrical battery cell 110, unlike the prismatic or pouch-shaped battery cell 110, an empty space into which the fire-retardant assembly 270 may be inserted may also be formed between the cylindrical battery cells 110. Therefore, the fire-retardant assembly 270 may also be inserted into the empty space.

First, according to one aspect of the present disclosure, it is possible to prevent or mitigate hot gas generated from a battery cell in which thermal runaway has occurred among one or more battery cells provided inside a battery assembly from being discharged toward a tab of the battery cell.

Second, according to another aspect of the present disclosure, it is possible to vent hot gas generated from the battery cell in which thermal runaway has occurred along an intended path.

Third, according to still another aspect of the present disclosure, it is possible to add a process of inserting a fire-retardant assembly (or a fire-retardant assembly material or a filler) into an empty space formed between a busbar assembly and a cell tab of a battery to the assembling process of the conventional battery assembly.

Fourth, according to yet another aspect of the present disclosure, it is possible to easily arrange a fire-retardant assembly when the battery assembly is assembled.

Fifth, according to yet another aspect of the present disclosure, it is possible to increase the stability of the battery assembly by increasing the heat resistance or fire resistance of the battery assembly.

Since the present disclosure may be carried out by being modified in any of various forms, the scope of the present disclosure is not limited to the above-described embodiments. Therefore, when the modified embodiments include the components of the claims of the present disclosure, the modified embodiments belong to the scope of the present disclosure.

What is claimed is:

1. A battery assembly comprising:
   a plurality of battery cells stacked in a preset stacking direction;
   an accommodation case configured to house the plurality of battery cells;
   an insertion space formed between the plurality of battery cells and the accommodation case; and
   a fire-retardant assembly disposed in the insertion space, wherein the fire-retardant assembly includes:
   a fire-retardant member including a fire-retardant material; and
   an exterior material configured to enclose the fire-retardant member therein,
   wherein the exterior material includes a body portion having a pipe shape extending in a height direction of the accommodation case,
   wherein the fire-retardant member includes a plurality of granular materials,
   further comprising a busbar electrically connected to the plurality of battery cells,
   wherein the insertion space is located between the busbar and the plurality of battery cells.

2. The battery assembly of claim 1, wherein the exterior material starts to melt at a preset temperature.

3. The battery assembly of claim 2, wherein the temperature is lower than a melting point of the fire-retardant member.

4. The battery assembly of claim 1, wherein the fire-retardant member includes silicon dioxide ($SiO_2$).

5. The battery assembly of claim 1, wherein at least one of both end portions of the exterior material has a tapered shape.

6. The battery assembly of claim 1, wherein the exterior material includes:
   a first end portion coupled to an upper side of the body portion to close one open end of both open ends of the body portion; and
   a second end portion coupled to a lower side of the body portion to close the other open end, and
   the first end portion has a tapered shape in a direction away from the body portion.

7. The battery assembly of claim 6, wherein the second end portion has an end face disposed parallel to a bottom surface of the accommodation case.

8. The battery assembly of claim 6, wherein the accommodation case includes:
   an accommodation body including an open upper surface and configured to accommodate the plurality of battery cells through the open upper surface; and
   an accommodation cover coupled to the accommodation body to cover the open upper surface, and
   the fire-retardant assembly is disposed so that the first end portion is disposed to face the accommodation cover.

9. The battery assembly of claim 1, wherein the exterior material includes:
   a body portion having a cylindrical shape, in which at least one end of both ends of the body portion is open; and
   an end portion coupled to the body portion to close at least one open end.

10. The battery assembly of claim 1, wherein a length of the exterior material in the height direction of the accommodation case is greater than a length of the exterior material in the stacking direction.

11. The battery assembly of claim 10, wherein a maximum length of the fire-retardant assembly in the stacking direction is smaller than or equal to a thickness of any one of the plurality of battery cells.

12. The battery assembly of claim 1, wherein the fire-retardant member includes a plurality of fire-retardant particles.

13. The battery assembly of claim 1, wherein the fire-retardant member includes a roll-shaped fire-retardant sheet.

14. The battery assembly of claim 1, wherein the exterior material has a cylindrical shape extending in a height direction of the accommodation case.

15. The battery assembly of claim 1, wherein the exterior material has a polyhedral shape.

16. The battery assembly of claim 1, wherein the insertion space includes:
   a first insertion space formed between the plurality of battery cells and one side surface of the accommodation case extending in the stacking direction; and
   a second insertion space formed between the plurality of battery cells and the other side surface of the accommodation case facing the one side surface of the accommodation case, and
   the fire-retardant member is disposed in at least any one of the first insertion space and the second insertion space.

17. The battery assembly of claim 1, wherein the fire-retardant member is a solid filler.

18. The battery assembly of claim 1, wherein the exterior material has a pillar shape extending in a height direction of the accommodation case.

* * * * *